United States Patent [19]

Ishibashi et al.

[11] Patent Number: 5,946,056
[45] Date of Patent: Aug. 31, 1999

[54] COLOR COMPOSING OPTICAL SYSTEM

[75] Inventors: Kazufumi Ishibashi, Ebina; Tetsuo Hattori, Yokohama, both of Japan

[73] Assignee: Nikon Corporation, Tokyo, Japan

[21] Appl. No.: 09/114,496

[22] Filed: Jul. 13, 1998

[30] Foreign Application Priority Data

Jul. 15, 1997 [JP] Japan ................................. 9-189429

[51] Int. Cl.$^6$ ........................ G02F 1/1335; G03B 21/00
[52] U.S. Cl. ............................. 349/9; 349/5; 349/57; 353/31
[58] Field of Search ....................... 349/5, 8, 9, 57, 349/95; 353/31, 33, 34

[56] References Cited

U.S. PATENT DOCUMENTS

| | | | |
|---|---|---|---|
| 4,943,154 | 7/1990 | Miyatake et al. | 353/31 |
| 4,969,731 | 11/1990 | Ogino et al. | 353/34 |
| 5,105,265 | 4/1992 | Sato et al. | 349/9 |
| 5,764,412 | 6/1998 | Suzuki et al. | 349/5 |
| 5,808,795 | 9/1998 | Shimomura et al. | 349/5 |

FOREIGN PATENT DOCUMENTS 5-210081  8/1993  Japan ................................. 349/5

*Primary Examiner*—William L. Sikes
*Assistant Examiner*—Dung Nguyen
*Attorney, Agent, or Firm*—Vorys, Sater, Seymour and Pease LLP

[57] ABSTRACT

In order to obtain an image without a registration shift, there is provided a color composing optical system which comprises a liquid crystal light valve having a plurality of pixels and a cross dichroic prism for color-composing the light beams emitted from the liquid crystal light valve, characterized in that the following equation is satisfied:

$$L \times |\tan\Theta| \leq W/2,$$

where the length of a pixel pitch of the liquid crystal light valve is W, the air-converted length from the liquid crystal light valve emission surface to the emission surface of the cross dichroic prism is L, and a value of a relative angular deviation when two light rays emitted from the liquid crystal light valve in parallel with the optical axis enter the cross dichroic prism and then are emitted from the cross dichroic prism is $\Theta$.

7 Claims, 23 Drawing Sheets

COLOR COMPOSING OPTICAL SYSTEM

COLOR COMPOSING OPTICAL SYSTEM

This application claim the benefit of Japanese Application No. 9-189429 which is hereby incorporated by reference.

BACKGROUND OF THE INVENTION

The present invention relates to a color composing optical system which composes colors of modulated light beams each emitted from a light valve for each color, to be projected in a full-color projecting apparatus, etc.

1. Related Art

FIG. 1 shows a schematic arrangement of a projecting apparatus which performs three-color decomposition and composition by use of a cross dichroic prism.

A white light emitted from a white light source 210 enters a polarizing beam splitter 220 and is polarized and separated by a polarization/separation portion of the polarizing beam splitter. The polarized light reflected and emitted (S-polarized light) is incident on the above-mentioned cross dichroic prism 230.

A red light component of the incident light is reflected by a red light reflecting dichroic film 230R inside the cross dichroic prism 230, so as to enter a reflection-type liquid crystal light valve 240R as a read light. Then, only a blue light component of this light is reflected by a blue light reflecting dichroic film 230B, so as to enter a liquid crystal light valve 240B for blue light as a read light.

A green light component transmitted through the above-mentioned red light and blue light reflecting dichroic films of the cross dichroic prism 230 is propagated as it is and is emitted from the cross dichroic prism 230, so as to enter a green light liquid crystal light valve 240G.

Each color light component entering the reflection-type liquid crystal light valve for the color is modulated by a signal recording light or an electric signal for each color (neither of which is shown in the figure) and is reflected and emitted from the light valve, so as to enter the cross dichroic prism 230 with the same optical axis as that of the above-mentioned incident light.

Then, the three light components are composed by the dichroic film 230R and the dichroic film 230B inside the cross dichroic prism 230, and emitted from the dichroic prism to enter the polarizing beam splitter 230, in which only a modulated light is analyzed. The modulated light is transmitted through the polarizing beam splitter and emitted to be projected onto a screen 260 through a projecting lens 250.

The cross dichroic prism 230 is comprised of, as shown in FIG. 2 for example, transparent optical glass members 231, 232, 233, 234 each taking the shape of a right-angled isosceles triangular prism. The sides of these isosceles triangular prisms are stuck together with predetermined dichroic films therebetween.

An arrangement of components of the conventional cross dichroic prism 230 is shown in FIG. 3. A member 231 and another member 233 are provided with the red light reflecting dichroic films each formed only on one side of two crossing four-cornered sides thereof, while a member 232 and a member 234 are provided with blue light reflecting dichroic films formed only on one side of two crossing four-cornered sides thereof, in the same manner.

The cross dichroic prism 230 mentioned above is produced by cementing the members shown in FIG. 3 together with an adhesive agent sandwiched therebetween.

Since it becomes difficult to maintain a predetermined accuracy in cementing when the four members are cemented together at one time, such a method of producing the cross dichroic prism is usually employed in which the members 231 and 232 are cemented together in advance to form a first connected member, while the members 233 and 234 are cemented together to form a second connected member, and finally the first connected member and the second connected member are cemented toghther to form the cross dichroic prism.

It should be noted that an arrangement in which one cross dichroic prism is used both for color decomposition and composition was employed for description of the projecting apparatus as the conventional device. However, there is present another projecting apparatus which performs color decomposition by use of a plane dichroic mirror and uses a cross dichroic prism only for color composition.

In the conventional projecting apparatus described above, there arise a problem that a projected image partly becomes a double image, or the image becomes blurred.

The present inventors have intensely examined the conventional projecting apparatus and found, as a result, the above problems are caused by different refractive indexes of the glass materials of the prisms for constituting the cross dichroic prism used for the three-color composition inside the apparatus.

More specifically, the refractive indexes of the glass prisms as the constituent members are slightly different from each other, so that if, for example, parallel light beams are incident on the optical axis, these light beams are supposed to be emitted in parallel to the optical axis in the same manner. However, if the light beams are emitted not in parallel to the optical axis due to the different refractive indexes of the constituent members of the prism through which the light beams are transmitted, it brings about the above-mentioned problems. Particularly, the above-mentioned cross dichroic prism is arranged to have four right-angled isosceles triangular prisms which are jointed at the right angle portions thereof to form a prism which is square in cross section, so that the light beams propagated in parallel with the optical axis have to be transmitted through the three prism members. As a result, it can be said that a difference in the refractive index among these prism members brings about a large influence.

In order to solve these problems, it is necessary to substantially remove a difference in the refractive index among the four prism members which constitutes the cross dichroic prism, which, however, is not easy.

Another problem of the cross dichroic prism for causing the above-mentioned problems is brought about by the structure of a dichroic film.

More specifically, in order to have the function as a color filter, the dichroic films of the cross dichroic prism are, seen in cross section thereof, provided on the both sides at the central portion and have a difference in level and an angle therebetween. These difference in level and angle cause a double or blurred image.

In the conventional dichroic prism, particularly the above-mentioned difference level is inevitably generated due to the thickness of the adhesive agent and can not be avoided so long that the adhesive agent has a finite thickness. In other words, a double or blurred image caused by it can not be prevented.

The above-mentioned two drawbacks are especially important in recent projecting apparatuses for projecting a large image, in which a double image becomes conspicuous in proportion to the size of a projected image.

SUMMARY OF THE INVENTION

The present invention has been conceived taking such problems into consideration, and an object of the invention is to provide a color composing optical system which can remove the problem caused by a difference in refractive index among the prism members so as to obtain an image without a registration shift.

According to one aspect of the present invention, there is provided a color composing optical system which comprises a liquid crystal light valve having a plurality of pixels and a cross dichroic prism for color-composing light beams emitted from the liquid crystal light valve, characterized in that the following equation is satisfied:

$$L \times |\tan\Theta| \leq W/2,$$

where the length of a pixel pitch of the liquid crystal light valve in the horizontal direction is W, the air-converted length from the emission surface of the liquid crystal light valve to the emission surface of the cross dichroic prism is L, and a value of a relative angular deviation when two light rays emitted from the liquid crystal light valve in parallel with the optical axis enter the cross dichroic prism and then are emitted from the cross dichroic prism is $\Theta$ (degree).

According to another aspect of the present invention, there is provided a color composing optical system which comprises a liquid crystal light valve having a plurality of pixels, and a cross dichroic prism including four right-angled isosceles triangular prisms cemented together with dichroic films therebetween for color-composing light beams emitted from the liquid crystal light valve, characterized in that the following equation is satisfied:

$$L \times |\tan(0.27 \times N1/3600)| \leq W/2,$$

where a value of $10^6$ times an absolute value of $\Delta 1$ which is defined by the following equation is N1:

$$\Delta 1 = (n1^2 + n4^2)/2 - (n2^2 + n3^2)/2,$$

in which the refractive indexes of one pair of right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of the liquid crystal light valve in the horizontal direction is W; and the air-converted length from the emission surface of the liquid crystal light valve to the emission surface of the cross dichroic prism is L.

According to still another aspect of the present invention, there is provided a color composing optical system which comprises a liquid crystal light valve having a plurality of pixels, and a cross dichroic prism including four right-angled isosceles triangular prisms cemented together with dichroic films therebetween for color-composing light beams emitted from the liquid crystal light valve, characterized in that the following equation is satisfied:

$$L \times |\tan(0.8 \times N2/3600)| \leq W/2,$$

where a value of $10^6$ times an absolute value of $\Delta 2$ defined by the following equation is N2:

$$\Delta 2 = (n1 + n4)/2 - (n2 + n3)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of the liquid crystal light valve in the horizontal direction is W; and the air-converted length from the emission surface of the liquid crystal light valve to the emission surface of the cross dichroic prism is L.

With the above-mentioned color composing optical system, a registration shift can be reduced, so as to obtain a projected image with the reduced registration shift.

According to a preferred embodiment of the present invention, the above-mentioned cross dichroic prism is characterized in that two pairs of light-reflecting dichroic films inside are arranged on the same plane, respectively.

For example, if the dichroic films for red and blue light beams of the dichroic prism which constitutes the composing optical system are dichroic prisms having flatness, an excellent image without a double image or a blur can be projected, which is an important effect when an image is projected in an enlarged manner on a large screen.

According to an embodiment of the present invention, there is provided a method of controlling the color composing optical system which comprises a liquid crystal light valve having a plurality of pixels and a cross dichroic prism for color-composing light beams emitted from the liquid crystal light valve, characterized in that the following equation is satisfied:

$$L \times |\tan\Theta| \leq W/2,$$

where the length of a pixel pitch of the liquid crystal light valve in the horizontal direction is W, the air-converted length from the emission surface of the liquid crystal light valve to the emission surface of the cross dichroic prism is L, and a value of a relative angular deviation when two light rays emitted from the liquid crystal light valve in parallel with the optical axis enter the cross dichroic prism and then are emitted from the cross dichroic prism is $\Theta$ (degree).

According to another embodiment of the present invention, there is provided a method of controlling the color composing optical system which comprises a liquid crystal light valve having a plurality of pixels, and a cross dichroic prism including four right-angled isosceles triangular prisms cemented together with dichroic films therebetween for color-composing light beams emitted from the liquid crystal light valve, characterized in that the following equation is satisfied:

$$L \times |\tan(0.27 \times N1/3600)| \leq W/2,$$

where a value of $10^6$ times an absolute value of $\Delta 1$ which is defined by the following equation is N1:

$$\Delta 1 = (n1^2 + n4^2)/2 - (n2^2 + n3^2)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of the liquid crystal light valve in the horizontal direction is W; and the air-converted length from the emission surface of the liquid crystal light valve to the emission surface of the cross dichroic prism is L.

According to still another embodiment of the present invention, there is provided a method of controlling the color composing optical system which comprises a liquid crystal light valve having a plurality of pixels, and a cross dichroic prism including four right-angled isosceles triangular prisms cemented together with dichroic films therebetween for color-composing light beams emitted from the liquid crystal light valve, characterized in that the following equation is satisfied:

$$L \times |\tan(0.8 \times N2/3600)| \leq W/2,$$

where a value of $10^6$ times an absolute value of $\Delta 2$ defined by the following equation is N2:

$$\Delta 2 = (n1+n4)/2 - (n2+n3)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of the liquid crystal light valve in the horizontal direction is W; and the air-converted length from the emission surface of the liquid crystal light valve to the emission surface of the cross dichroic prism is L.

DESCRIPTION OF THE PREFERRED EMBODIMENTS

Figure 1:
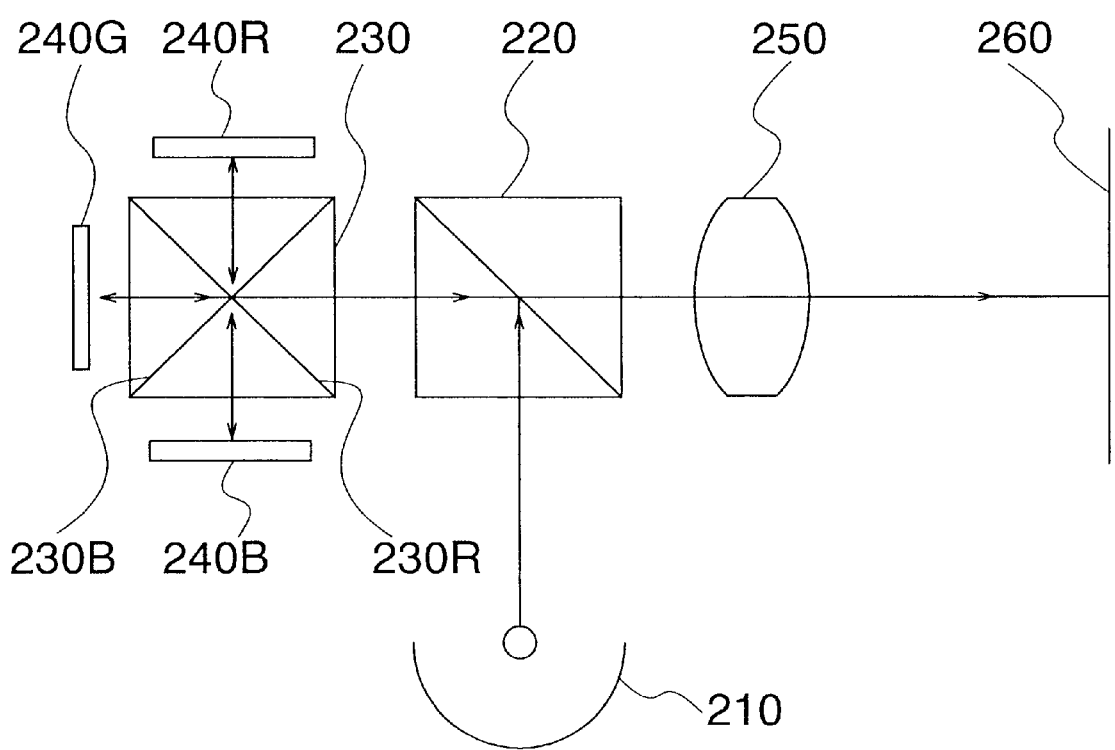
FIG. 1 is a schematic structural view for showing a projecting apparatus.
Figure 2:
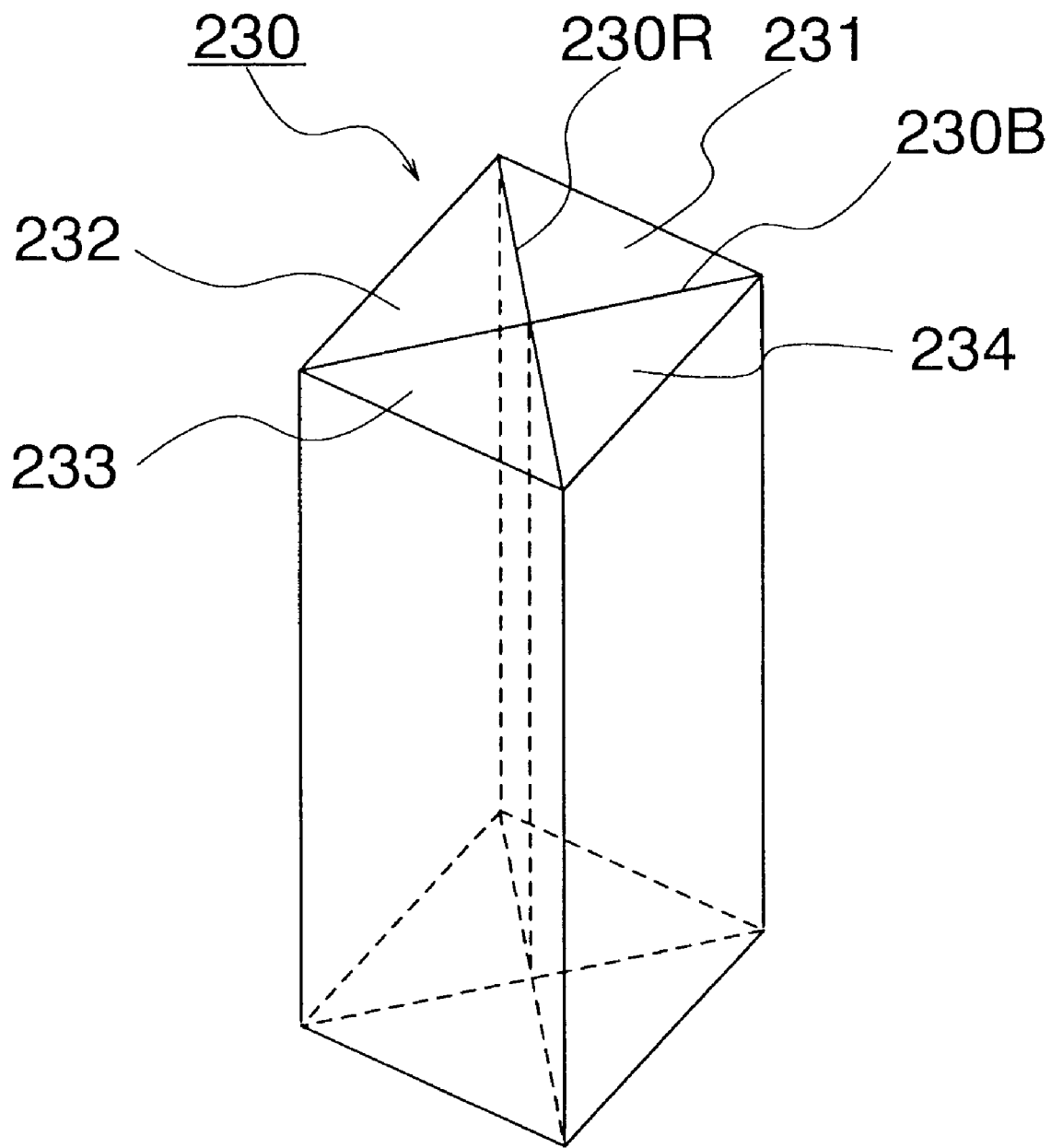
FIG. 2 is a perspective view of a conventional cross dichroic prism.
Figure 3:
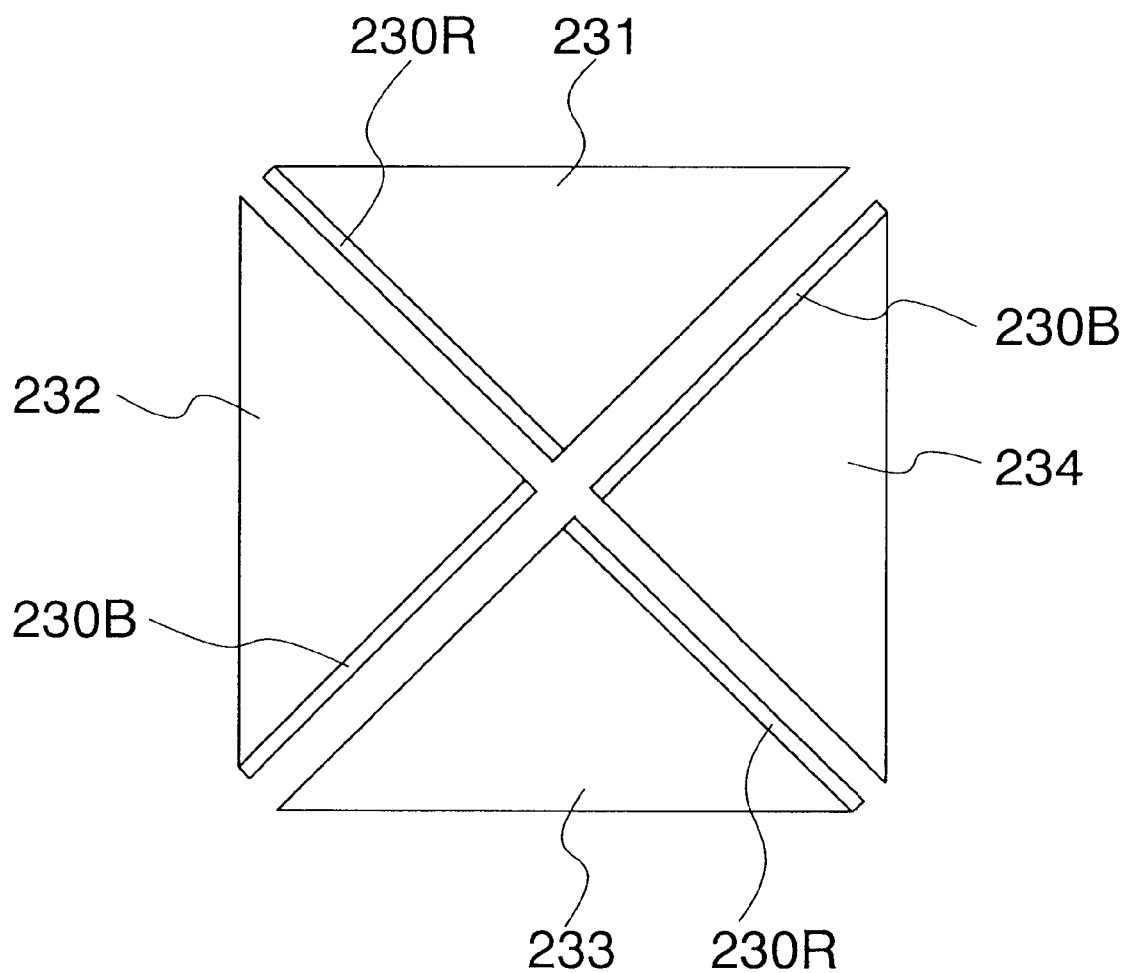
FIG. 3 is a view for showing constituent members of the conventional cross dichroic prism.
Figure 4:
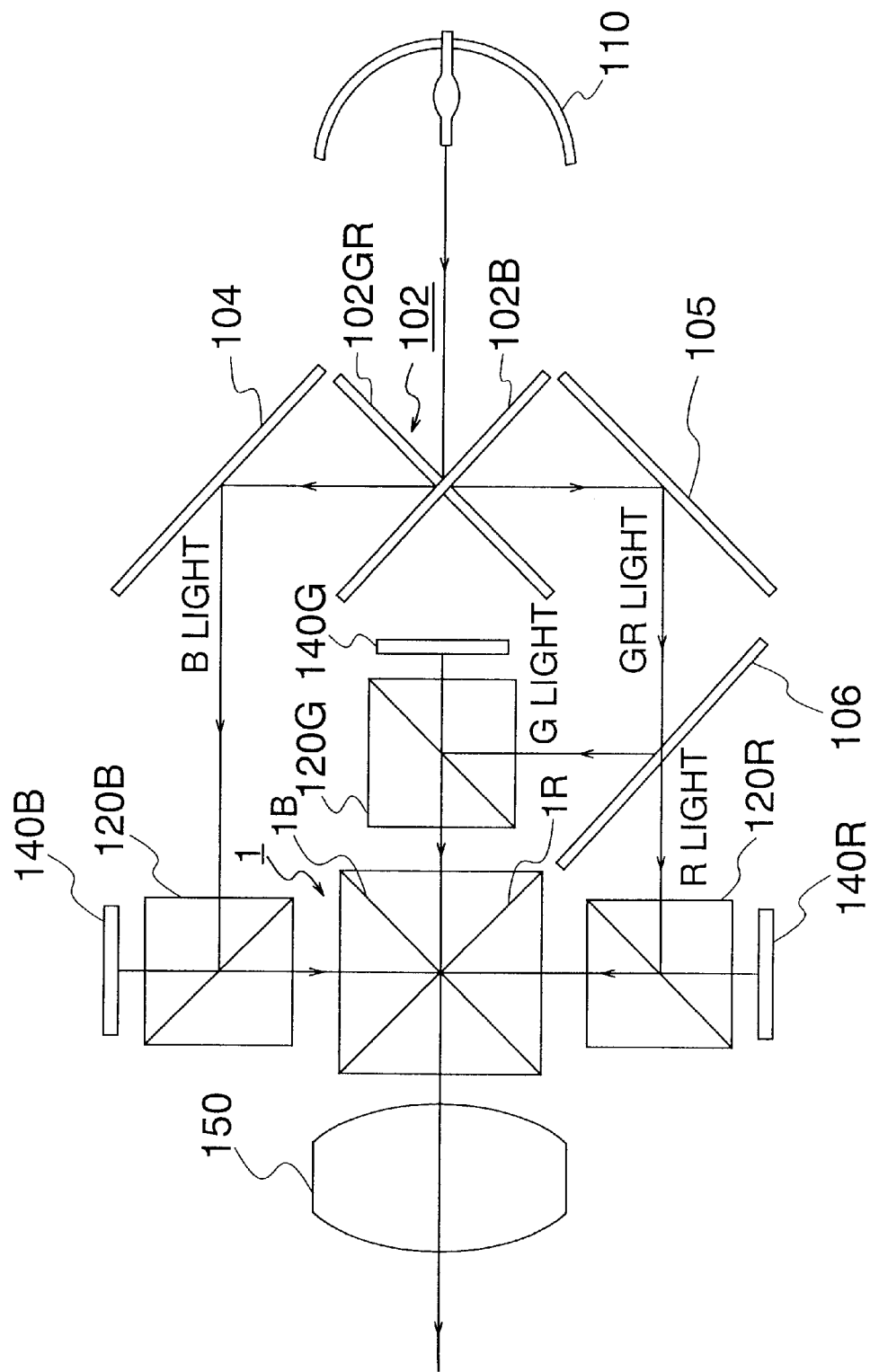
FIG. 4 is a view for explaining a schematic arrangement of a projecting apparatus in which a cross dichroic prism according to the present invention is assembled.

FIG. 4 is a view for schematically showing a projecting apparatus which performs three-color composition by use of a cross dichroic prim according to an embodiment of the present invention.

This projecting apparatus is provided with a light source 110 comprised of a lamp and a concave mirror, a beam splitter 102 for color decomposition comprised of a pair of dichroic mirrors 102GR, 102B crossing each other, a dichroic mirror 106 for further separating the color of a light reflected by the dichroic mirror 102GR, polarizing beam splitters 120R, 120G, 120B on which the light beams of the separated three colors are respectively incident, liquid crystal light valves 140R, 140G, 140B in which the color light beams splitted by the polarizing beam splitters 120R, 120G, 120B are respectively incident, a cross dichroic prism 1 on which the color light beams transmitted through the beam splitters 120R, 120G, 120B are respectively incident, and a projecting lens 150 for projecting the image of the light beams which are composed by the cross dichroic prism 1 onto a screen, or the like.

A white light emitted from the light source 110 is separated into red and green light, and blue light by the beam splitter 102 which is comprised of the dichroic mirror 102GR for reflecting red light and green light, and the dichroic mirror 102B for reflecting blue light. The red light and the green light reflected by the dichroic mirror 102GR are further reflected by the mirror 105 and then separated into red light and green light by the dichroic mirror 106 which transmits red light and reflects green light.

The red, green, and blue light beams thus decomposed are respectively incident on the polarizing beam splitters 120R, 120G, 120B. It should be noted that the blue light reflected by the dichroic mirror 102B is incident on the polarizing bean splitter 120B through the mirror 104. Each of the polarized color light beams (the S-polarized light beams) is changed its course into a crossing direction by the polarizing beam splitters 120R, 120G, 120B, and the S-polarized light beams are respectively reflected by the liquid crystal light valves 140R, 140G, 140B. In this case, the reflected light beams from the liquid crystal light valves 140R, 140G, 140B are modulated to change their directions of polarization by the double refraction of the liquid crystal layer in accordance with the intensity of a matrix-type signal supplied to the liquid crystal light valves 140R, 140G, 140B.

The light beams returned from the liquid crystal light valves 140R, 140G, 140B are incident on the polarizing beam splitters 120R, 120G, 120B, respectively. In this case, only the P-polarized light beams are transmitted through the polarizing beams splitters 120R, 120G, 120B, so that the intensity of each of the color light beams reflected by the liquid crystal light valves 140R, 140G, 140B and transmitted through the polarizing beam splitters 120R, 120G, 120B is modulated in a desired spatial distribution.

The light beams from the polarizing beam splitters 120R, 120G, 120B are incident on the cross dichroic prism 1 from different directions, respectively. This cross dichroic prism 1 is provided with a first plane 1R which reflects red light and transmits green light, and a second plane 1B which reflects blue light and transmits green light. The red light incident on the cross dichroic prism 1 is reflected by the first plane 1R, the green light incident on the cross dichroic prism 1 is transmitted through the first and second planes 1R, 1B, and the blue light incident on the cross dichroic prism 1 is reflected by the second plane 1B. As a result, the red, green and blue light beams incident on the cross dichroic prism 1 are composed in an aligned manner, so as to enter the projecting lens 150. Images respectively modulated by the liquid crystal light valves 140R, 140G, 140B are displayed in an superposing manner on an unrepresented screen.

Figure 5:
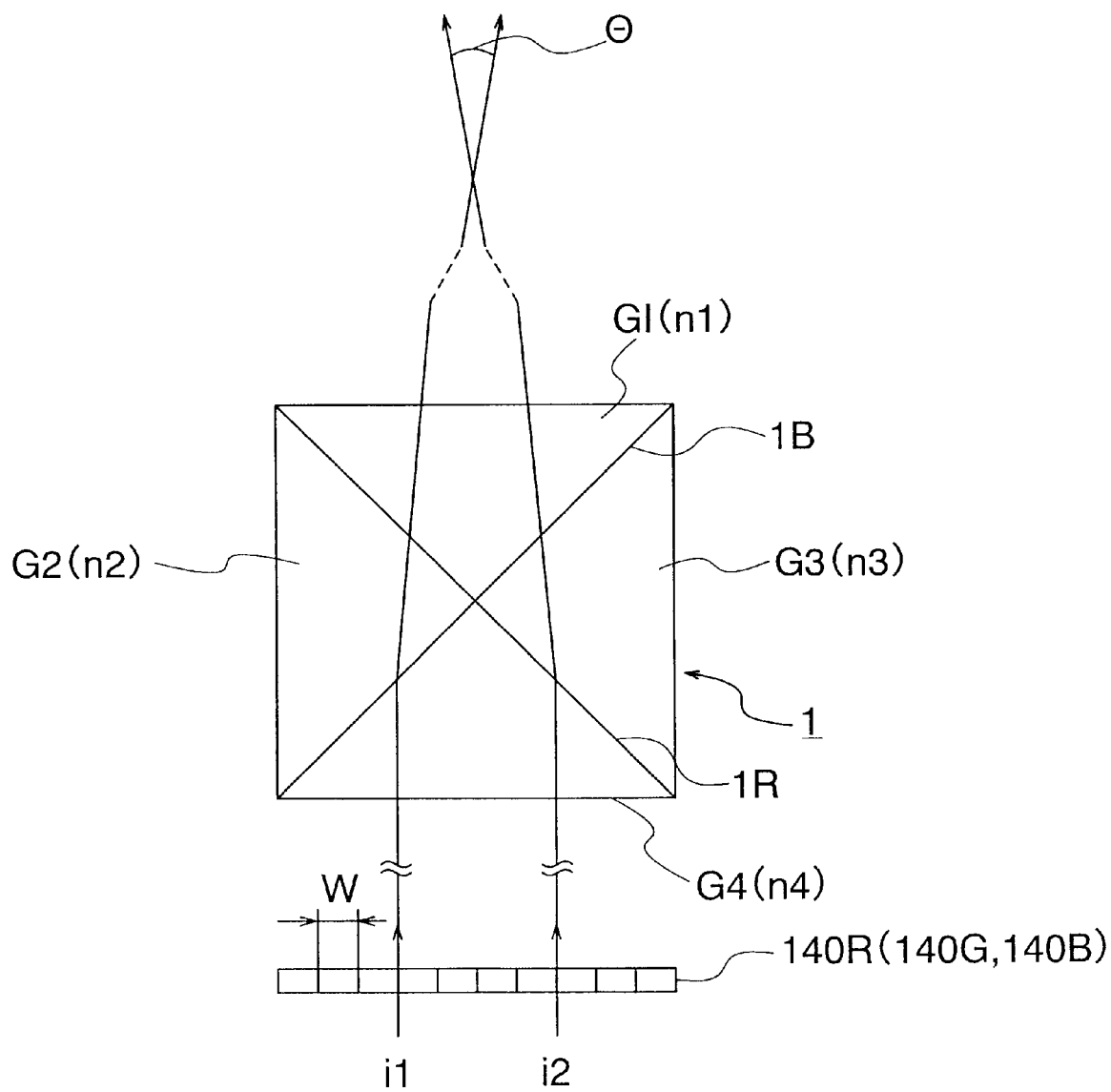
FIG. 5 is a view for showing a cross section of the cross dichroic prism and two light rays incident thereon in parallel with the optical axis.

FIG. 5 is a cross-sectional view of the cross dichroic prism 1 which is to be assembled in the projecting apparatus shown in FIG. 4. This cross dichroic prism 1 consists of four isosceles triangular prisms G1, G2, G3, G4. As clearly shown from FIG. 5, the prism G4 is disposed at a position opposite to the prism G1, while the prism G3 is disposed at a position opposite to the prism G2. If, for example, the joint face between the prisms G1, G2 and the prisms G3, G4 is called the first plane 1R, the joint face between the prisms G1, G3 and the prisms G2, G4 is called the second plane 1B.

Next, description will be made on an arrangement that a relative angular deviation of light emitted from the dichroic prism 1 can be controlled by use of a parameter which is defined by the refractive indexes of the prisms constituting the dichroic prism 1.

The cross dichroic prism 1 is formed by cementing the isosceles triangular prisms G1, G2, G3, G4 having the same cross sectional form together with the right angle planes thereof facing each other. As shown in FIG. 5, the refractive indexes of the prisms G1, G2, G3 and G4 are n1, n2, n3 and n4, respectively.

Now that two light rays i1 and i2 enter vertically on the incident surface of the member G4, the light ray i1 is propagated through the members G4, G2, G1 in the directions which are determined by the refractive indexes of these members, and emitted from the member G1. On the other hand, the light ray i2 is propagated through the members G4, G3, G1 in the same manner, and is emitted from the member G1.

The angle (the relative angular deviation) Θ formed by these emitted light rays is determined by the refractive indexes of the members G1, G2, G3, G4. If all of the refractive indexes are the same, the relative angular deviation Θ becomes zero. However, it is unattainable that all of the refractive indexes are really the same, as described above.

Here, consideration will be given to an amount Δ1 which is defined by the following equation (1):

$$\Delta 1 = (n1^2 + n4^2)/2 - (n2^2 + n3^2)/2 \qquad (1).$$

Figure 6:
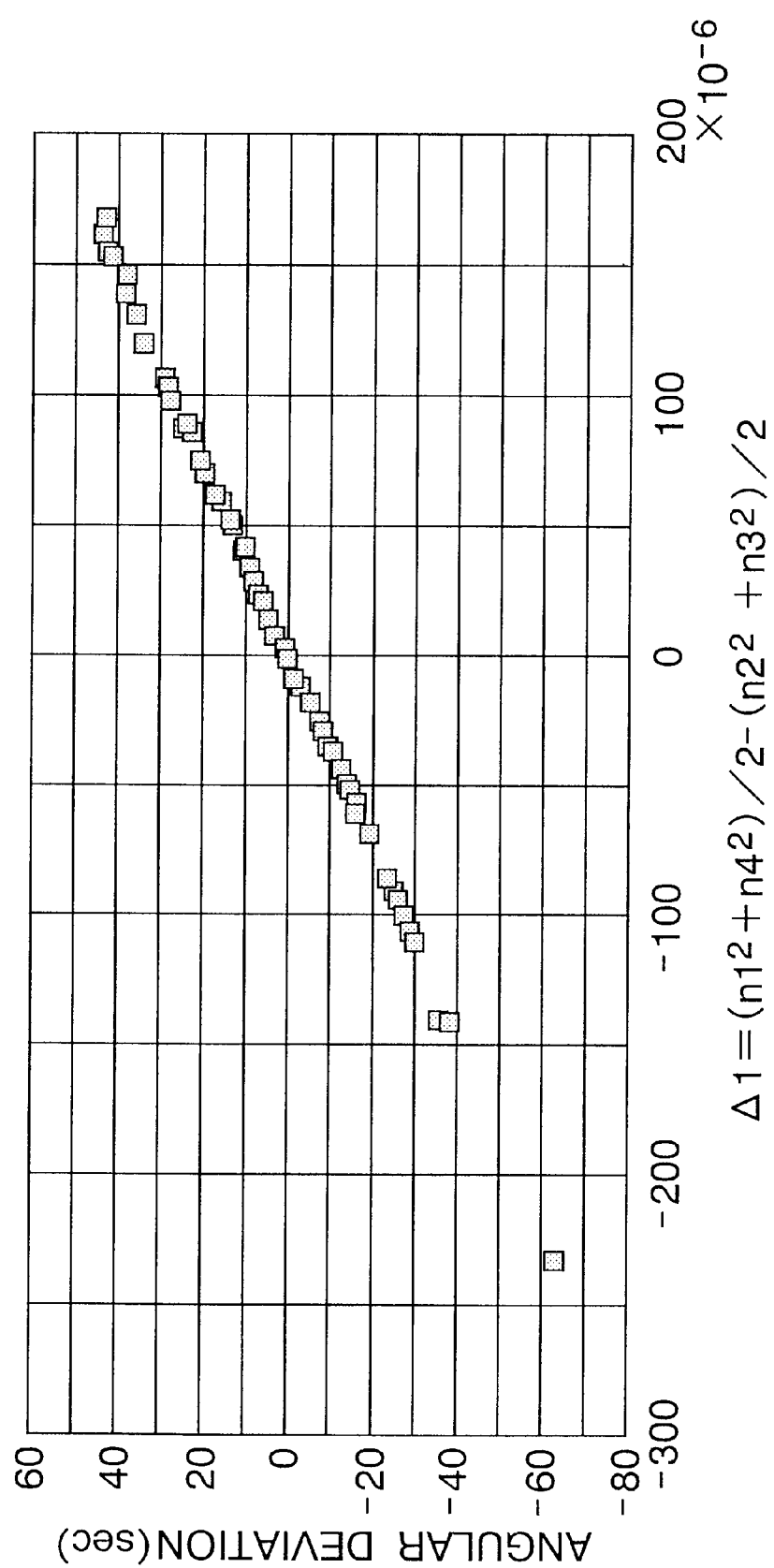
FIG. 6 is a graph for showing the relationship between $\Delta 1$ and the relative angular deviation which is formed by emitted light beams corresponding to the two parallel incident light rays of FIG. 5.

FIG. 6 is a graph for showing the relationship between a value (denoted by N1) which is $10^6$ times as many as the value of Δ1 defined by the equation (1) and plotted along the abscissa, and the relative angular deviation Θ. It should be noted that a unit of the relative angular deviation along the ordinate is an angle/second.

It can be understood from FIG. 6, a value of the relative angular deviation Θ is proportional to a value of Δ1 (or N1) defined by the equation (1).

Next, consideration will be given to an amount Δ2 which is defined by the following equation (2):

$$\Delta 2 = (n1 + n4)/2 - (n2 + n3)/2 \qquad (2).$$

Figure 7:
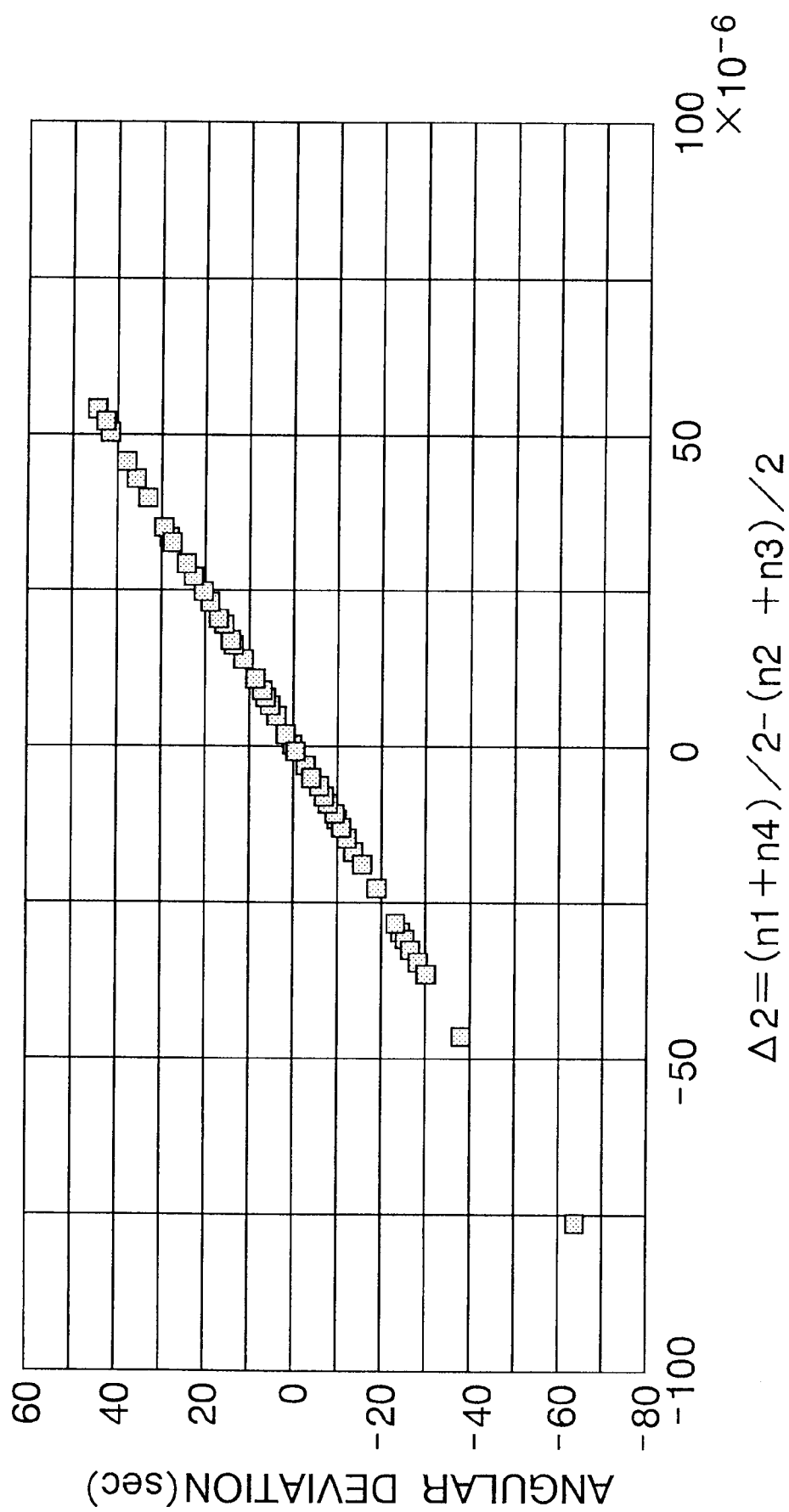
FIG. 7 is a graph for showing the relationship between $\Delta 2$ and the relative angular deviation which is formed by emitted light beams corresponding to the two parallel incident light rays of FIG. 5.

FIG. 7 is a graph for showing the relationship between a value (denoted by N2) which is $10^6$ times as many as the value of Δ2 defined by the equation (2) and plotted along the abscissa, and the above-mentioned relative angular deviation Θ. It should be noted that a unit of the relative angular deviation along the ordinate is an angle/second, in the same manner.

It can be understood from FIG. 7, a value of the relative angular deviation Θ is also proportional to a value of Δ2 (or N2) defined by the equation (2).

Figure 8:
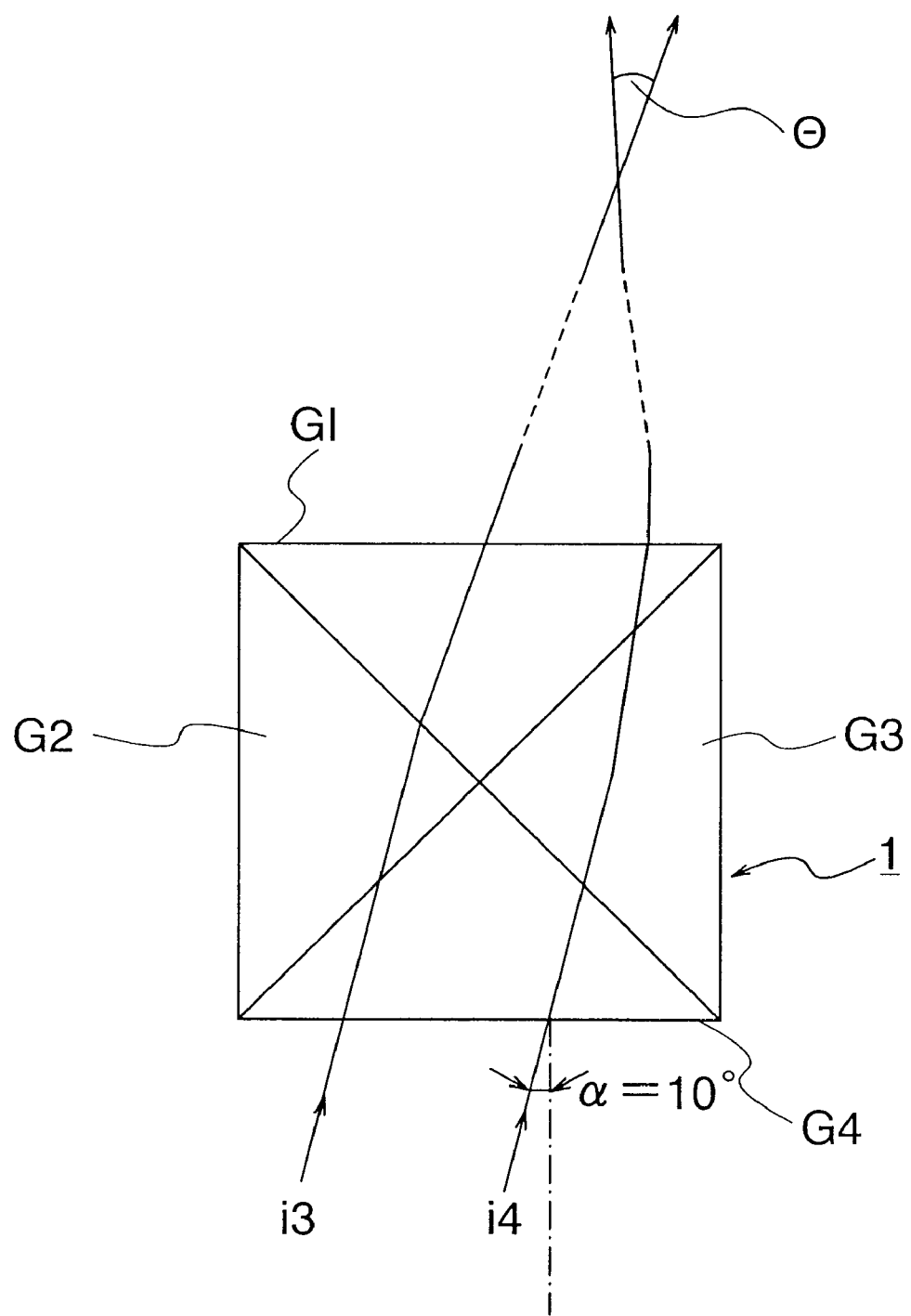
FIG. 8 is a view for showing a cross section of the cross dichroic prism and two parallel light beams incident thereon having an angle with respect to the optical axis.

Next, FIG. 8 shows a state when the parallel rays i3 and i4 enters the member G4 of the cross dichroic prism 1 as having an incident angle α=10 degrees therebetween, and the relative angular deviation Θ of the both rays emitted from the member G1.

Figure 9:
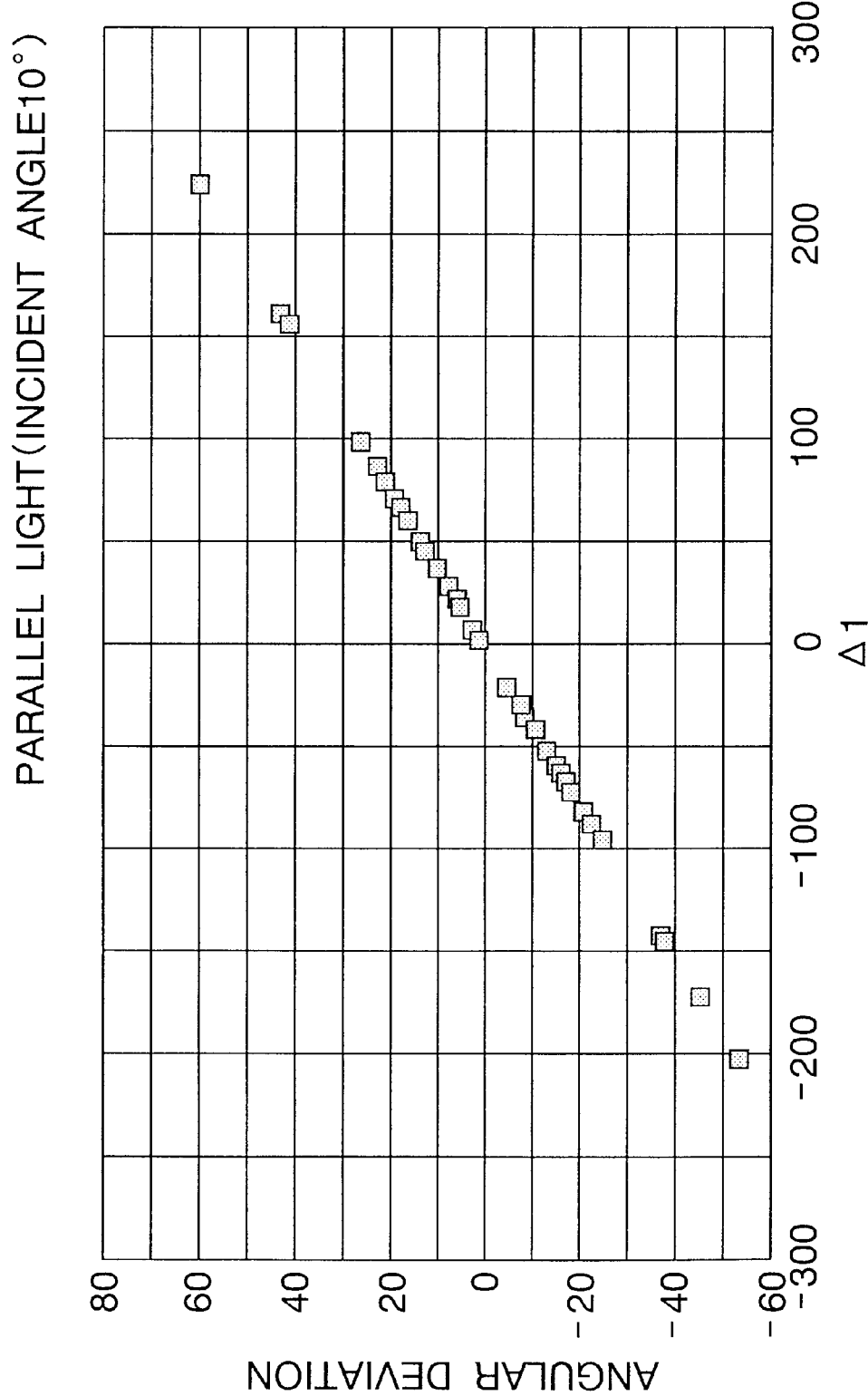
FIG. 9 is a graph for showing the relationship between $\Delta 1$ and the relative angular deviation which is formed by emitted light beams corresponding to the two parallel incident light rays of FIG. 8.

FIG. 9 shows the relationship between N1 which is defined by the above equation (1) plotted along the abscissa and the relative angular deviation Θ along the ordinate in this case. Also, FIG. 10 shows the relationship between N2 which is defined by the above equation (2) plotted along the abscissa and the relative angular deviation Θ along the ordinate.

Figure 10:
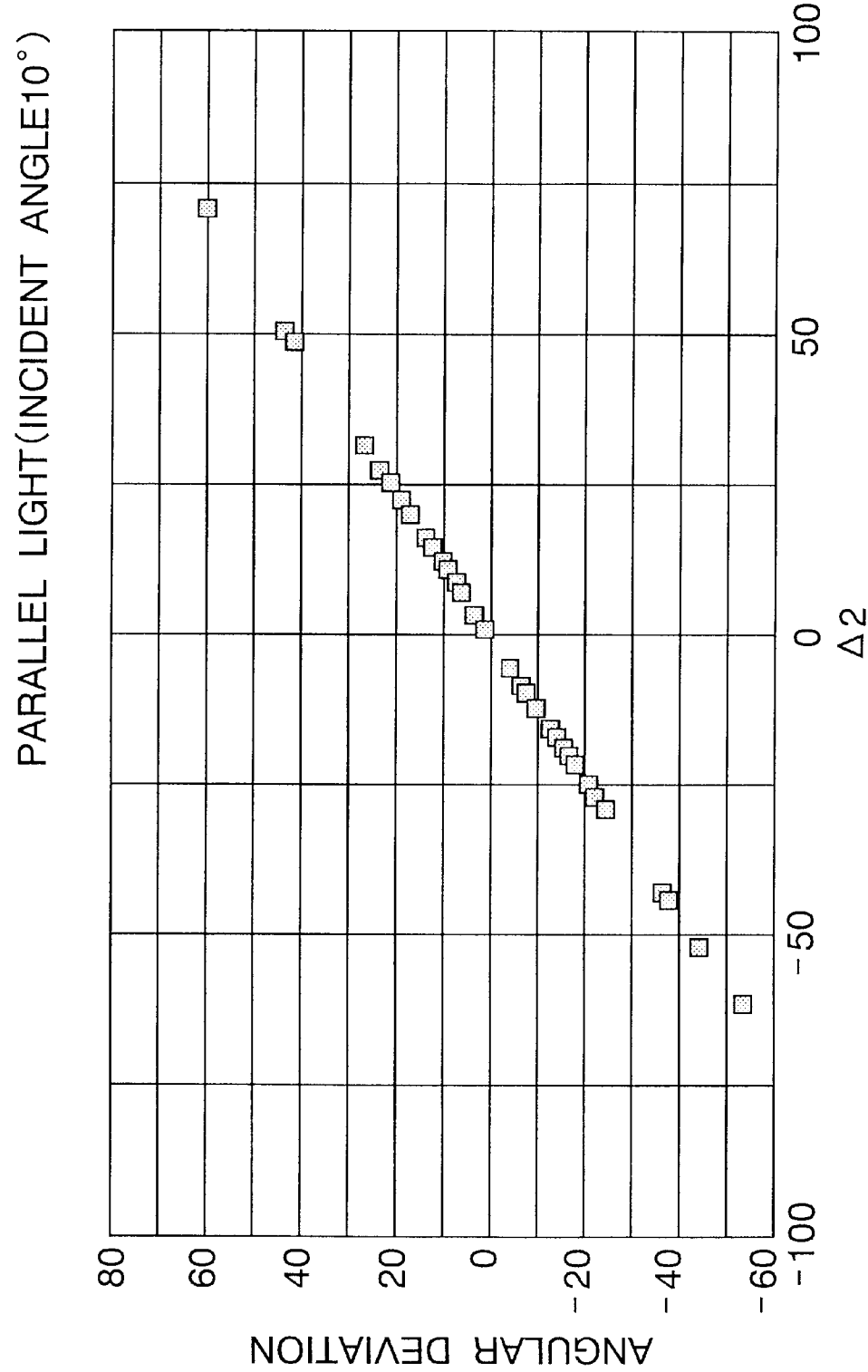
FIG. 10 is a graph for showing the relationship between $\Delta 2$ and the relative angular deviation which is formed by emitted light beams corresponding to the two parallel incident light rays of FIG. 8.

From these FIG. 9 and FIG. 10, the relationship that N1 or N2 is proportional to the relative angular deviation Θ in the same manner can be understood.

Figure 11:
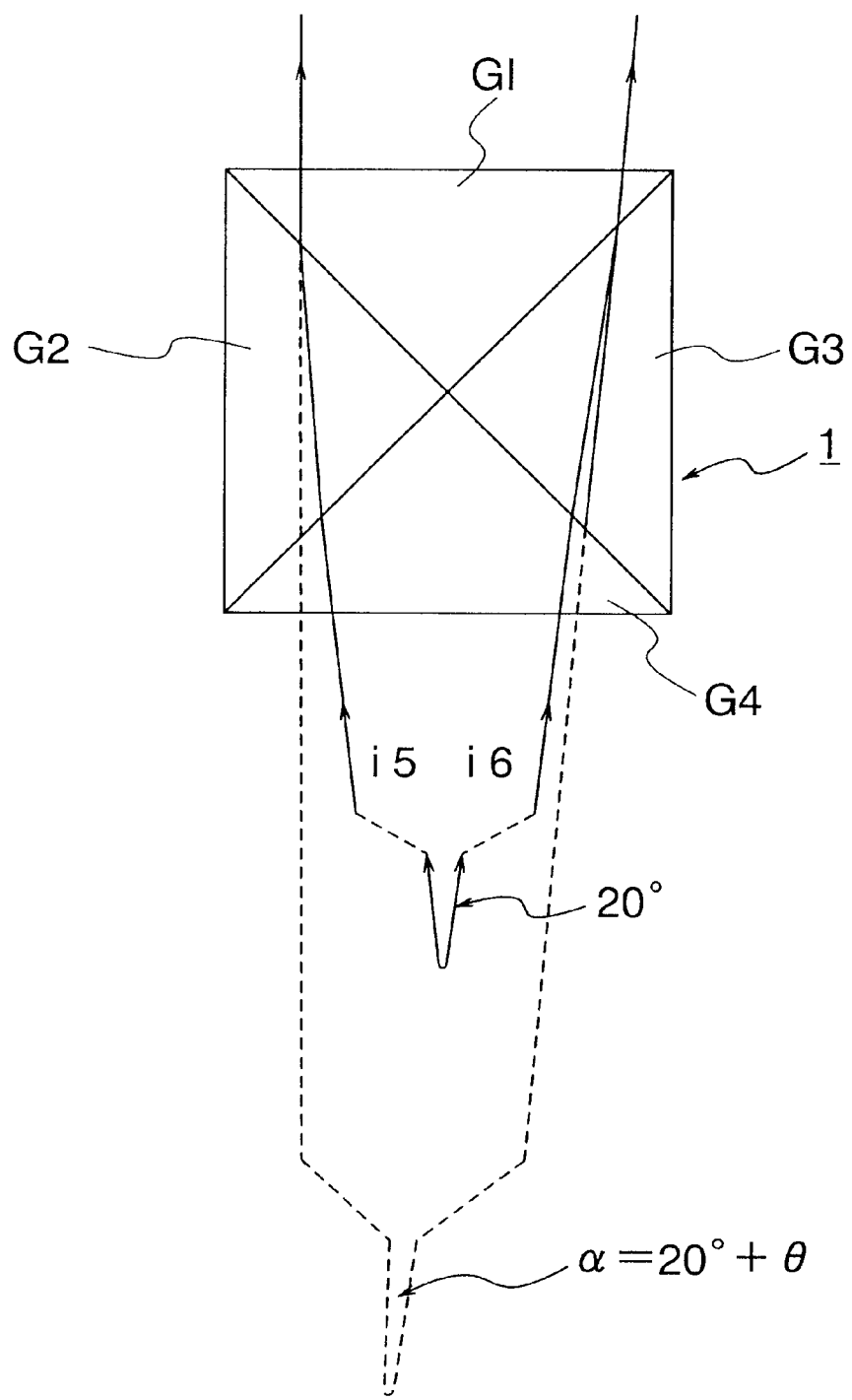
FIG. 11 is a view for showing a cross section of the cross dichroic prism and two directing light rays incident thereon each having an angle with respect to the optical axis.

Further, FIG. 11 shows a state when diverging light rays i5, i6 which are propagated respectively with an angle of 10 degrees with respect to the optical axis, that is, with an divergent angle of 20 degrees therebetween, are incident on the member G4 of the cross prism 1, and shows a relative exit angle α of the both light rays emitted from the member G1. In this case, an angle which is obtained by subtracting 20 degrees from the relative exit angle α of emission is used as the relative angular deviation Θ.

Figure 12:
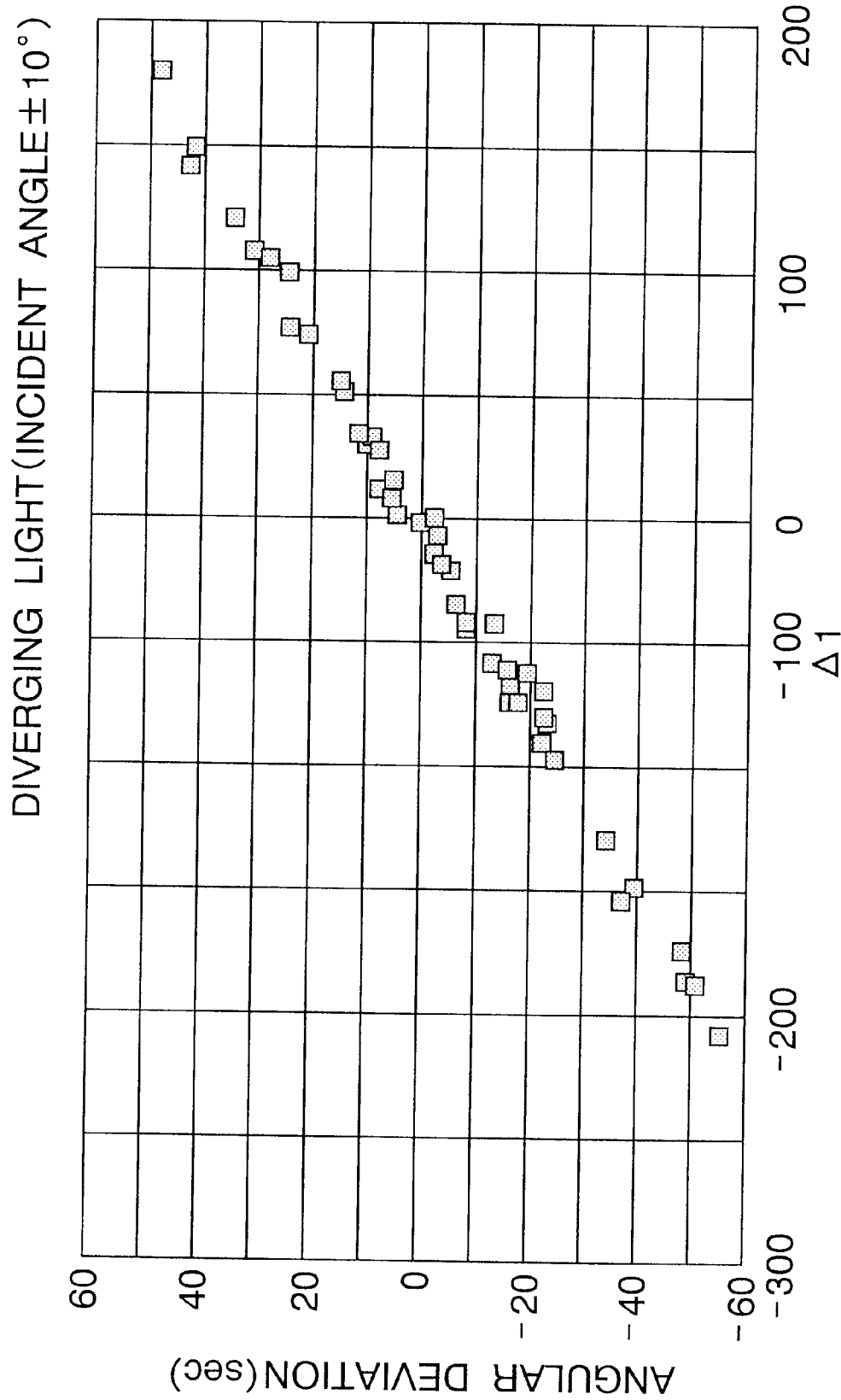
FIG. 12 is a graph for showing the relationship between $\Delta 1$ and the relative angular deviation which is formed by emitted light beams corresponding to the two parallel incident light rays of FIG. 11.

FIG. 12 shows the relationship between Δ1 (or N1) which is defined by the above equation (1) plotted along the abscissa and the relative angular deviation Θ along the ordinate in this case. Also, FIG. 13 shows the relationship between Δ2 (or N2) which is defined by the above equation (2) plotted along the abscissa and the relative angular deviation Θ along the ordinate.

Figure 13:
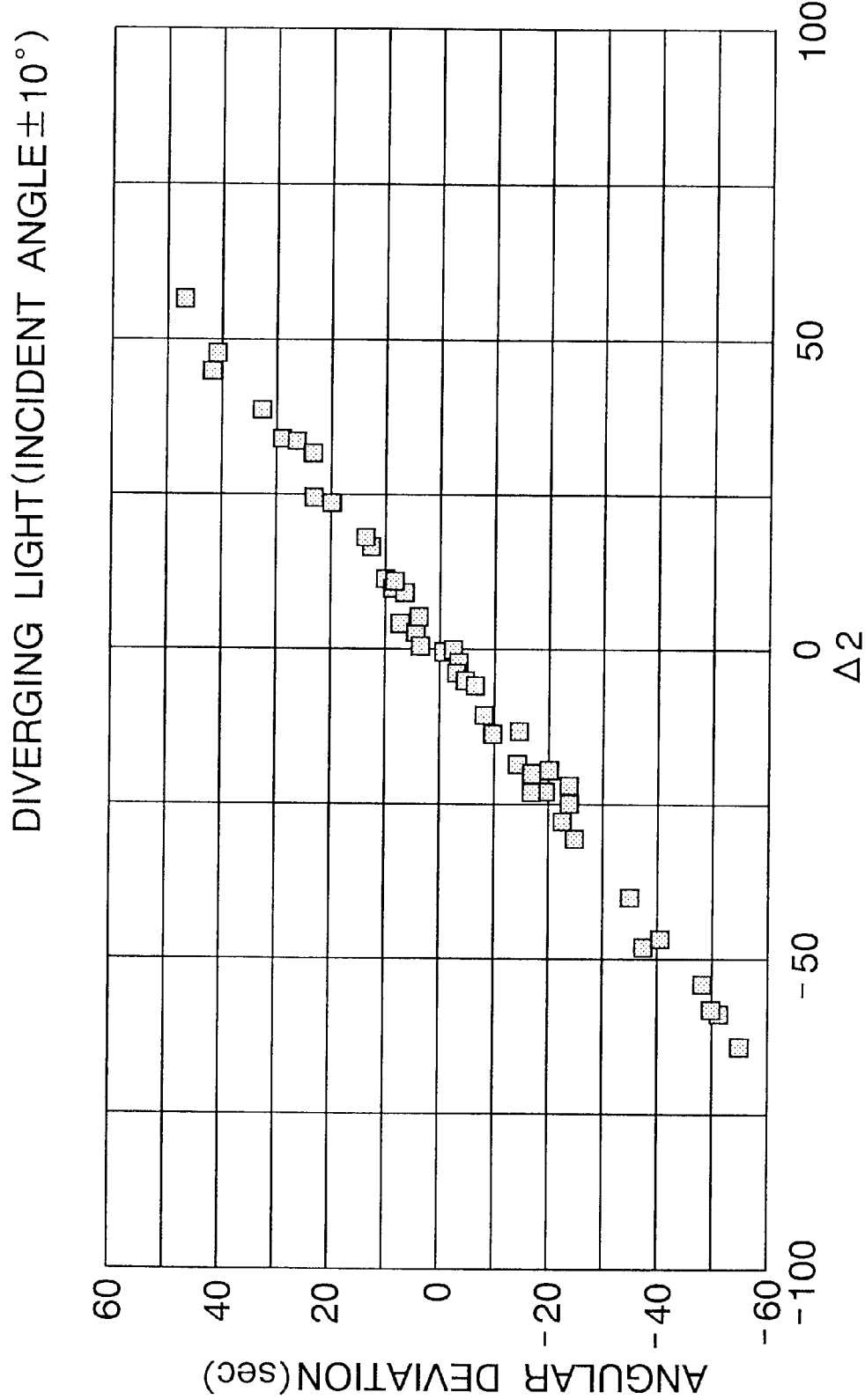
FIG. 13 is a graph for showing the relationship between $\Delta 2$ and the relative angular deviation which is formed by emitted light beams corresponding to the two parallel incident light rays of FIG. 11.

From these FIG. 12 and FIG. 13, the relationship that N1 or N2 is proportional to the relative angular deviation Θ in the same manner can be understood.

It can be understood that the relative angular deviation Θ of the light ray emitted from the cross prism when the above-mentioned three kinds of incident light ray are taken into consideration takes the same value, if a fixed value for Δ1 (or N1) which is defined by the abscissa permits. It can also be understood that the same relative angular deviation Θ is taken in the same manner at the fixed value also in the case of Δ2 (or N2).

Taking the above circumstances into consideration, it was found that the relative angular deviations of the above-mentioned three kinds of the two light rays emitted from the cross dichroic prism can be controlled by using the above N1 and N2 defined from the values of the refractive indexes of the prisms.

Here, reference will be made to the meaning of the relative angular deviation Θ which is defined above in the structure of a projection-type display device.

From the above conclusion, it can be understood that the relative angular deviation Θ will be explained in the following description by use of the parallel light rays (the light rays i1, i2) which were described first for the three kinds of the light rays.

However, even if the relative angular deviation Θ is equal, it can not be said that a shift amount at the time of emission from the cross dichroic prism related to the two light rays. For example, there are cases in which the liquid crystal light valves are arranged considerably away from the emission surface of the cross dichroic prism, or arranged in the vicinity of the incident surface of the cross dichroic prism. Because the shift amount is sometimes varied since the length of an optical path related to the light rays is varied depending on such arrangement of the liquid crystal light valves.

Here, the air-converted length L to be used in the following will be defined.

Figure 14:
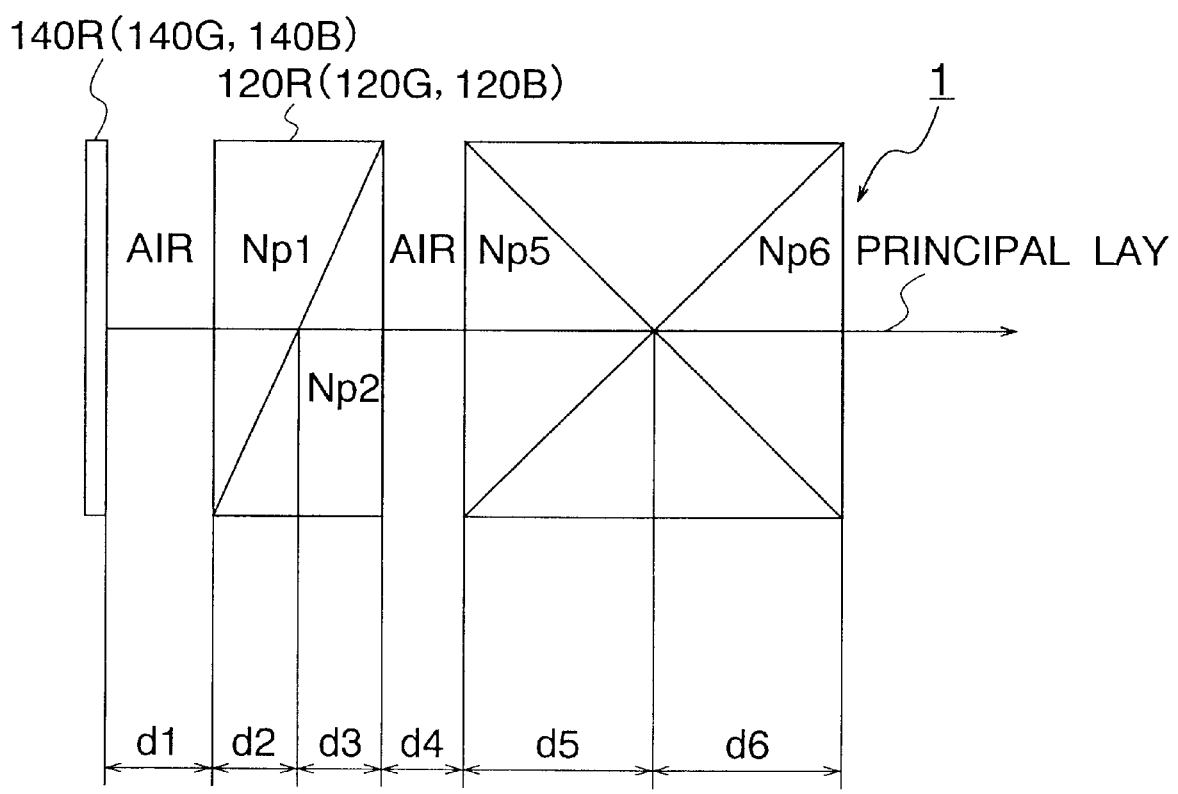
FIG. 14 is a view for explaining the definition of the air-converted length.

As shown in FIG. 14, the air-converted length L is expressed by the equation L=Σ(di/npi), where the geometrical distance of each medium through which the principal ray from the light valve is transmitted until it is emitted from the cross dichroic prism is di, and the refractive index of the medium with respect to the air is npi.

In the case of FIG. 14, the air-converted length L is expressed by the following equation:

$$L = d_1 + d_2/np_2 + d_3/np_3 + d_4 + d_5/np_4 + d_6/np_6.$$

The above-mentioned two light rays are assumed to be transmitted through the cross dichroic prism, respectively, and be emitted with the relative angular deviation Θ. In this case, if the air-converted length of the optical axis from the emission surface of the light valve to the emission surface of the cross dichroic prism is L, a relative shift amount ΔL between the two light rays can be approximated by the following equation at the time of emission from the cross dichroic prism:

$$\Delta L = L \times \tan(\Theta) \tag{3}.$$

As a result, there arises no problem in a image of the light which is transmitted through the cross dichroic prism and projected by a projection lens if this relative shift amount ΔL is within a range of a half, preferably a third, of the size of the pixel for forming the light valve.

Here, description will be returned on the graph in FIG. 6 for showing N1 and the relative angular deviation Θ and the graph in FIG. 7 for showing N2 and the relative angular deviation Θ.

It can be seen form the graph in FIG. 6 that the following equation is satisfied for the relationship between the relative angular deviation Θ (unit: degree) and N1(=Δ1×10^6):

$$\Theta = 0.27 \times N1/3600 \tag{4}.$$

On the other hand, it can be seen from the graph in FIG. 7 that the following equation is satisfied for the relationship between the relative angular deviation Θ (unit: degree) and N2(=Δ2×10^6):

$$\Theta = 0.8 \times N2/3600 \tag{5}.$$

When the equations (4) and (5) are substituted for the equation (3) and the unit of the relative angular deviation Θ is second, the following equations (6) and (7) are respectively satisfied:

$$L = L \times \tan(0.27 \times N1/3600) \tag{6},$$

and $$L = L \times \tan(0.8 \times N2/3600) \tag{7}.$$

On the other hand, there arises no problem in a projected image, as described above, if the shift amount satisfies the following equations with respect to the size (width) W of a pixel of the light valve (the length of the pixel in the horizontal direction or the pixel pitch):

$$L \times \tan(0.27 \times N1/3600) \leq W/2 \tag{8, or}$$

$$L \times \tan(0.8 \times N2/3600) \leq W/2 \tag{9},$$

or more preferably $$L \times \tan(0.27 \times N1/3600) \leq W/3 \tag{10},$$

or $$L \times \tan(0.8 \times N2/3600) \leq W/3 \tag{11}.$$

As stated, it is possible to control the relative angular deviation of the light emitted from the dichroic prism even if there is a difference in the refractive index among the prisms constituting the dichroic prism by arranging the dichroic prism and the liquid crystal light valves to satisfy the above equations, that is, by adjusting the air-converted length L, so as to obtain an excellent projected image without blur. It is also possible, according to this method, to control the relative angular deviation by use of a value which does not depend on the form of the prism or the liquid crystal light valve, so as to enhance the degree of freedom in the image control.

The relationships described above will be explained more fully by way of examples.

EXAMPLE 1

If pixels each in the size of 40 μm in the horizontal direction (corresponding to W mentioned above) and 30 μm in the vertical direction are used as light valves 140R, 140G, 140B, the air-converted length from the emission surface of the cross dichroic prism 1 to the emission surface of the liquid light valves 140R, 140G, 140B is 40 mm, and values of the refractive index are 1.500100 for n1, and 1.500000 for n2, n3, and n4, respectively, a value of Δ1 becomes 150 (a value of Δ2 is 50) and the shift amount becomes 12 μm or around, so as to satisfy both the equations (7) and (8).

However, if the air-converted length becomes 60 mm (including the cases in which the size of the prism 1 becomes large, and the distance between the prism 1 and the light valves 140R, 140G, 140B becomes large), when light valves having pixels of the same size are used, the shift amount becomes 18 μm or around. In this case, the equations (8) and (9) are satisfied, though the equations (10) and (11) are not satisfied.

Further, if the distance between the light valves and the prism becomes large and the air-converted length becomes 80 mm, the shift amount becomes 24 μm and any of the equations (8) to (11) is not satisfied, which is not desirable.

Further, if the pixels of the light valves become of high definition and the size of each of the pixels is reduced to half (W is equivalent to 20 μm), the equations (8) to (11) can not be satisfied with a combination of the above-mentioned refractive indexes when the air-converted length is 40 mm or more.

EXAMPLE 2

If the same light valves as those in the Example 1 are used and n1 and n4 are 1.50000, n2 is 1.499000, and n3 is 1.50100 as the refractive indexes of the four prisms for forming the cross dichroic prism 1, values of Δ1 and Δ2 become substantially zero, and the shift amount also becomes substantially zero irrespective of a value of the air-converted length from the light valves 140R, 140G, 140B to the prism 1. In this case, any of the equations (8) to (11) is fully satisfied.

With this combination of prisms, the equations (8) to (11) can be fully satisfied even if the size of the pixel of the light valves becomes 20 μm and, further, the air-converted length becomes large.

EXAMPLE 3

If as the refractive indexes of the prisms for constituting the cross dichroic prism 1, n1 is 1.500074, n2 is 1.500122, n3 is 1.500143, and n4 is 1.500029, the shift amount is 13 μm when the air-converted length of the light valve is 40 mm, 26 μm when the air-converted length is 80 mm, and 33 μm when the air-converted length is 100 mm. Then, the equations (8) to (11) are not satisfied if the width (W) of the pixel of the light valves is 40 μm and the air-converted length is 80 mm or more.

Further, when the width W of the pixel of high definition of the light valves becomes 20 μm, any of the equations (8) to (11) can not be satisfied with the air-converted length of not less than 40 mm.

EXAMPLE 4

If as the refractive indexes of the prisms for constituting the cross dichroic prism 1, n1 is 1.500183, n2 is 1.500139, n3 is 1.500096, and n4 is 1.500118, the shift amount is 5 μm when the air-converted length between the light valves and the prism is 40 mm, 10 μm when the air-converted length is 80 mm, and 13 μm when the air-converted length is 100 mm. Then, the equations (8) to (11) are satisfied if the width W of the pixel of the light valves is 40 μm until the air-converted length reaches 100 mm. Further, when the pixel of the light valves becomes of high definition to have the width W of the 20 μm, the equations (8) and (9) are satisfied even if the air-converted length is 100 mm. However, the equations (10) and (11) are not satisfied when the air-converted length becomes 100 mm.

EXAMPLE 5

If as the refractive indexes of the prisms for constituting the cross dichroic prism 1, n1 is 1.500005, n2 is 1.500177, n3 is 1.500181, and n4 is 1.500156, the shift amount is 16 μm when the air-converted length between the light valves and the prism is 40 mm, 32 μm when the air-converted length is 80 mm, and 40 μm when the air-converted length is 100 mm, so that when the light valve having the pixel of 40 μm in width is used, the equations are not satisfied if the air-converted length becomes larger than 40 mm. Further, when the light valves having the pixel of a higher definition is used, the equations (8) and (9) are also not satisfied.

EXAMPLE 6

In the foregoing examples, a difference in the refractive index among the prisms is 0.0001 or less. However, according to the present example, even if the difference in the refractive index among the prisms is 0.1, it is possible to realize a combination of prisms with a small shift amount. In this case, only the equation (1) is effective, and the equation (2) can not be employed since it deviates from a range of approximation. That is, only Δ1 is to be obtained, and the equations (8) and (10) are used for obtaining the shift amount.

If as the refractive indexes of the prisms for constituting the cross dichroic prism 1, n1 is 1.700000, n2 is 1.900000, n3 is 1.473092, and n4 is 1.700000, the shift amount can be made substantially zero even when the air-converted length falls into a range from 40 mm to 100 mm. In this case, the equations (8) and (10) can be fully satisfied even if a light valve having a pixel of high definition as having the width W not only of 40 μm, but of 20 μm is used.

Assembling Method

The above arrangements are conceived to obtain a projected image with no defect by ideally disposing the four isosceles triangular prisms for constituting the cross dichroic prism 1 and then examining influences of the refractive indexes of those four prisms on the registration for a projected image.

In the cross dichroic prism 1 according to the embodiments, dichroic films are formed on joint faces between each two of the prism members, as stated before. Further, an adhesive agent is usually used for cementing the prism members together. The adhesive agent has its finite thickness, which may generate a shift in registration as mentioned above, a double image, or other bad influences depending on an arrangement of these members.

Though the cross dichroic prism 1 according to the present embodiment has the prism members in the relationships stated above, it is preferable to produce this cross dichroic prism 1 by the method described below. It is also preferable that the cross dichroic prism 1 has a structure produced by this method.

Figure 15:
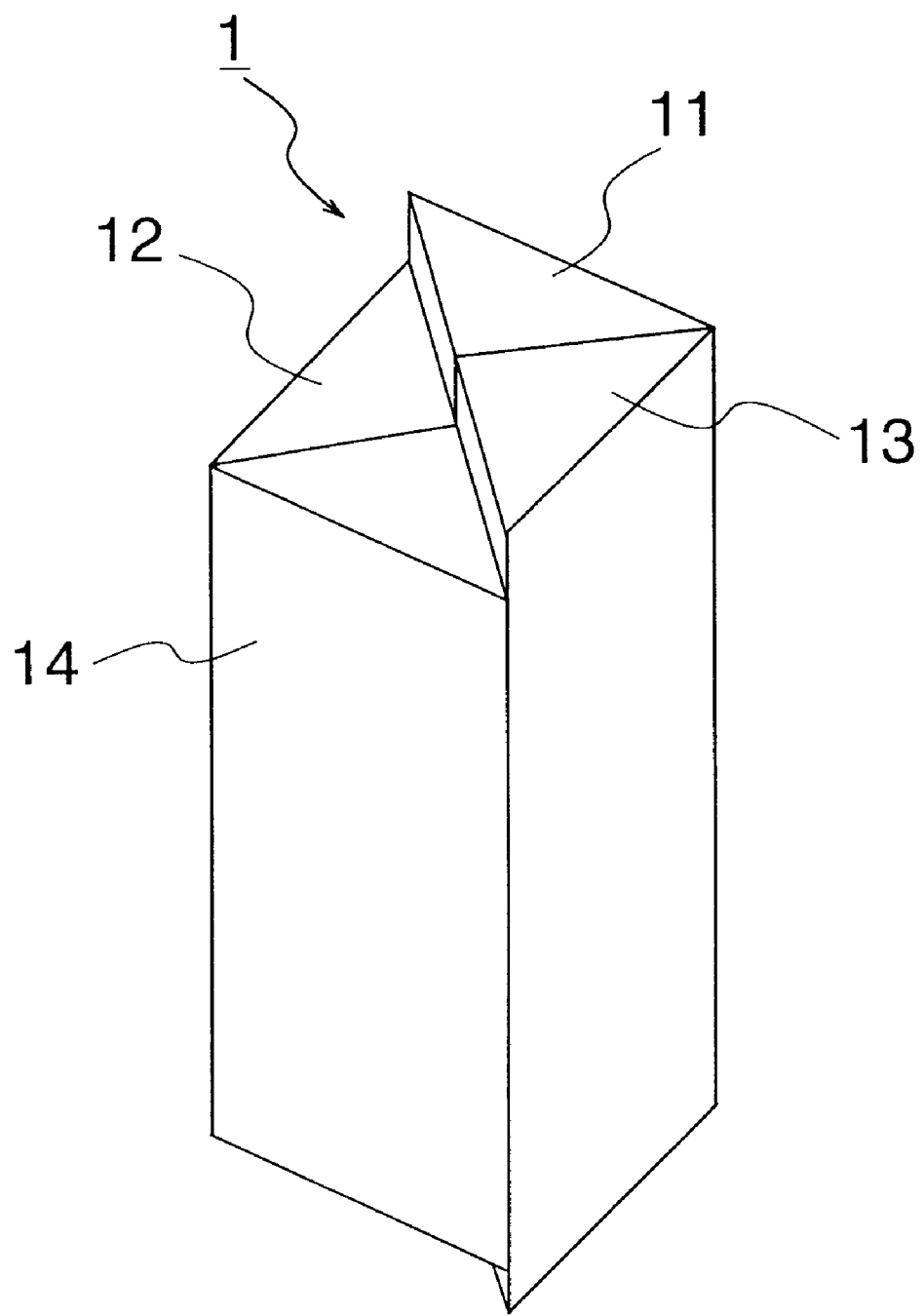
FIG. 15 is a perspective view of a cross dichroic prism according to the present invention.
Figure 16:
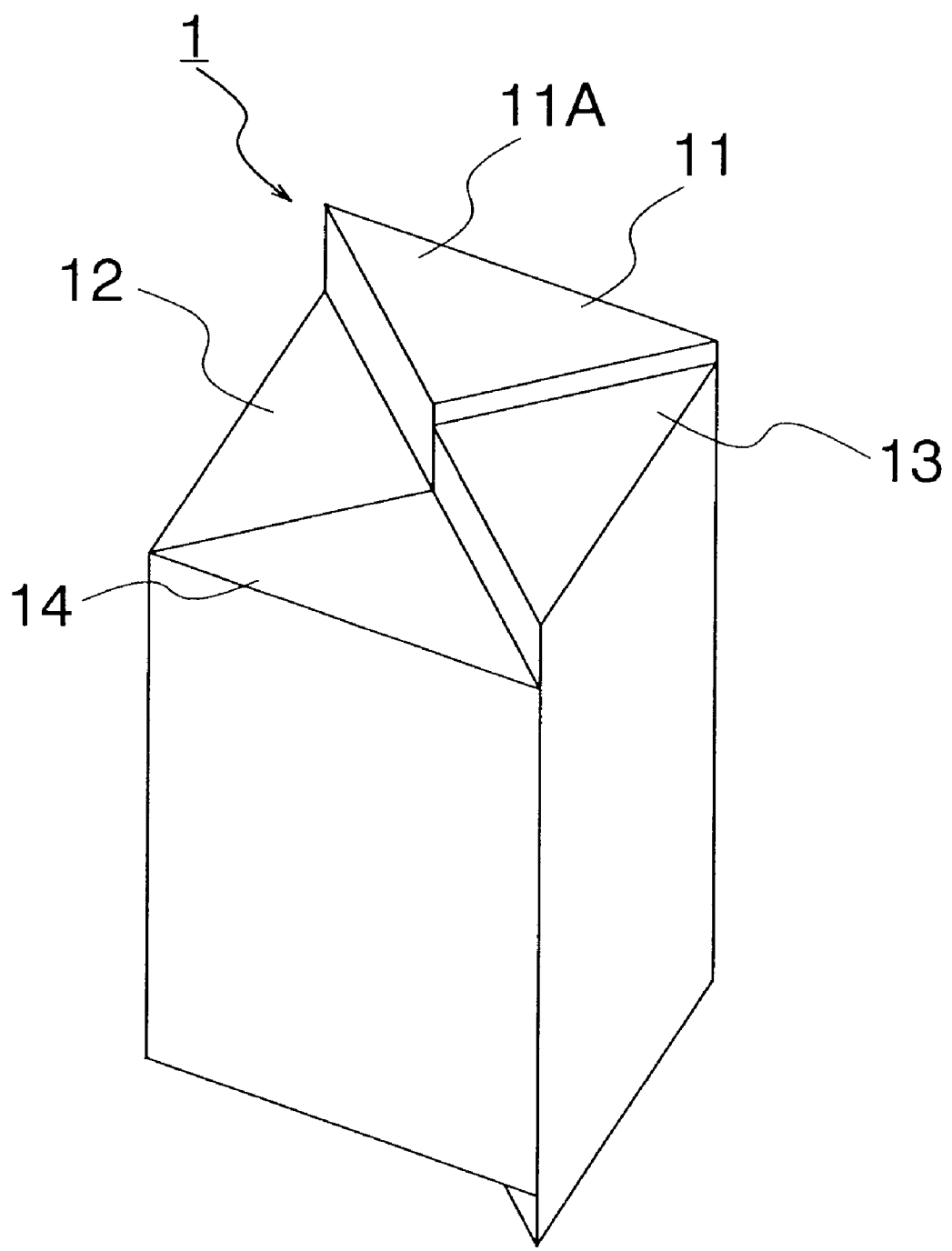
FIG. 16 is a perspective view of a cross dichroic prism having an arrangement in which only the side of one prism member is projecting.

FIG. 15 and FIG. 16 show examples of the cross dichroic prism 1 produced by the following method. FIG. 15 is a perspective view of the prism 1 in which projecting portion of the connection member (or prism member) 15 is substantially the same as that of the connection member (or prism member) 16, while FIG. 16 is a perspective view of the prism 1 in which the projecting portion of the connection member (or prism member) 15 is different from that of the connection member (or prism member) 16.

In FIG. 16, the most projecting portion 11A can be used as a reference plane for mounting the cross dichroic prism 1 on the projecting apparatus if the side of the member 11 is ground and polished with accuracy in advance.

A first assembling method of the cross dichroic prism 1 will be described below for each step thereof.

First Assembling Method

First Step

There are prepared right-angled isosceles triangular prism members 11, 12, 13, 14 having the refractive indexes n1, n2, n3, n4 which satisfy the above equation (8) or (9). In this case, the cross sectional form of all of the prism members is the same right-angled isosceles triangle. However, with respect to the length thereof, the prism members 11, 13 are longer than the prism members 12, 14.

The both slanting surfaces of each of these prism members sandwiching the right-angular portion and the bottom surface thereof are required to be optically polished in advance.

Second Step

Figure 20:
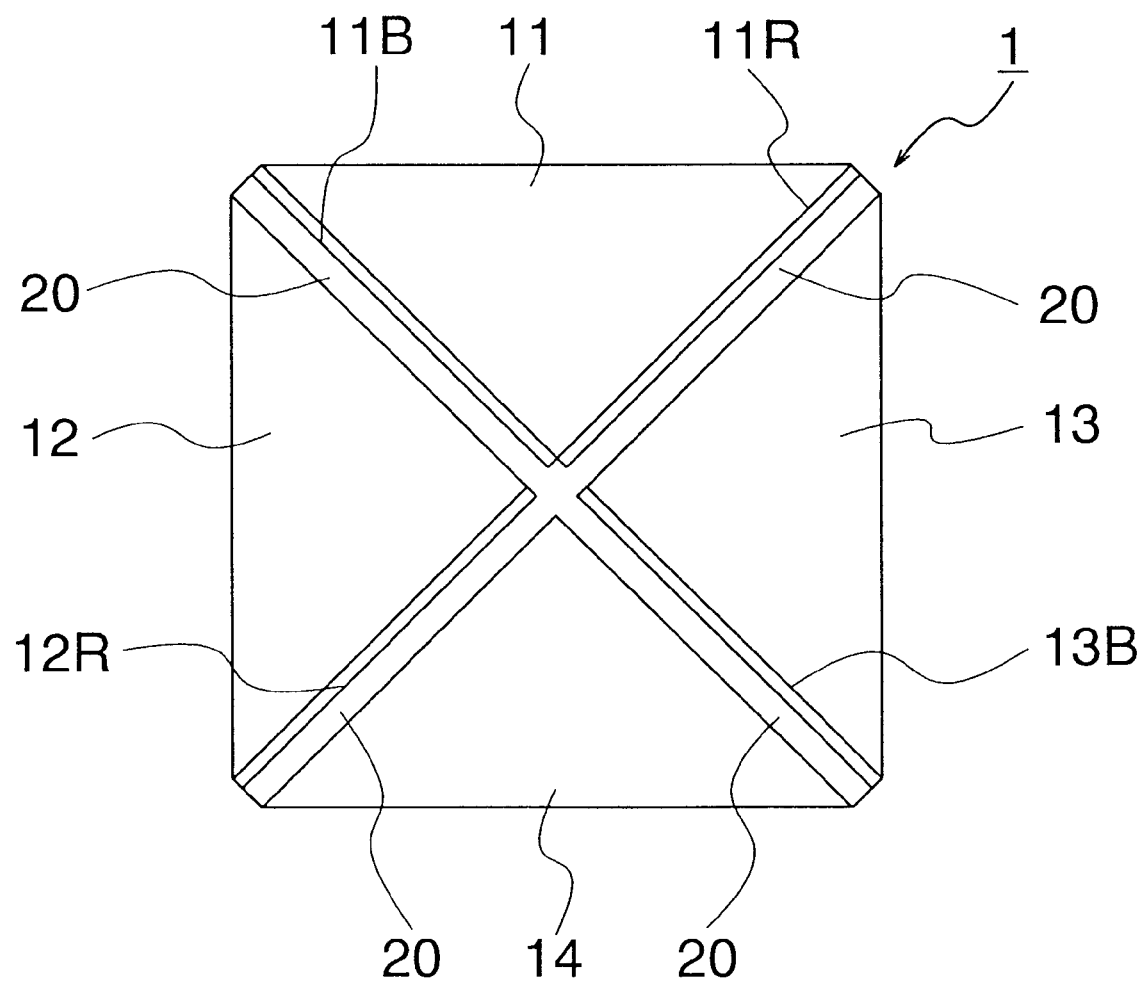
FIG. 20 is a cross-sectional view of the cross dichroic prism according to the present invention.

A dichroic film 11B for reflecting the first light (B light) is formed on the first slanting surface of the member 11 and a dichroic film 11R for reflecting the second light (R light) on the second slanting surface thereof by a physical vapor deposition such as vacuum vapor deposition (see FIG. 20).

A dichroic film 12R for reflecting the second light (R light) is formed on one of the slanting surfaces of the member 12.

A dichroic film 13B for reflecting the first light (B light) is formed on one of the slanting surfaces of the member 13.

Third Step

The above-mentioned members 11 and 12 are cemented together in such manner that the slanting surface of the member 11 with the first light reflecting dichroic film 11B formed thereon is connected with the slanting surface of the member 12 with no dichroic film formed by an adhesive agent, so as to form a connected member 15. In this case, it is necessary to connect the member 11 in such a manner that both ends of the member 11 protrudes from both ends of the member 12.

The member 13 and the member 14 are cemented together in such manner that the slanting surface of the member 13 with the first light reflecting dichroic film 13B formed thereon is connected with the slanting surface of the member 14 with no dichroic film formed by an adhesive agent, so as to form a connected member 16. In this case, it is necessary to connect the member 13 in such a manner that both ends of the member 13 protrudes from both ends of the member 14.

Figure 17:
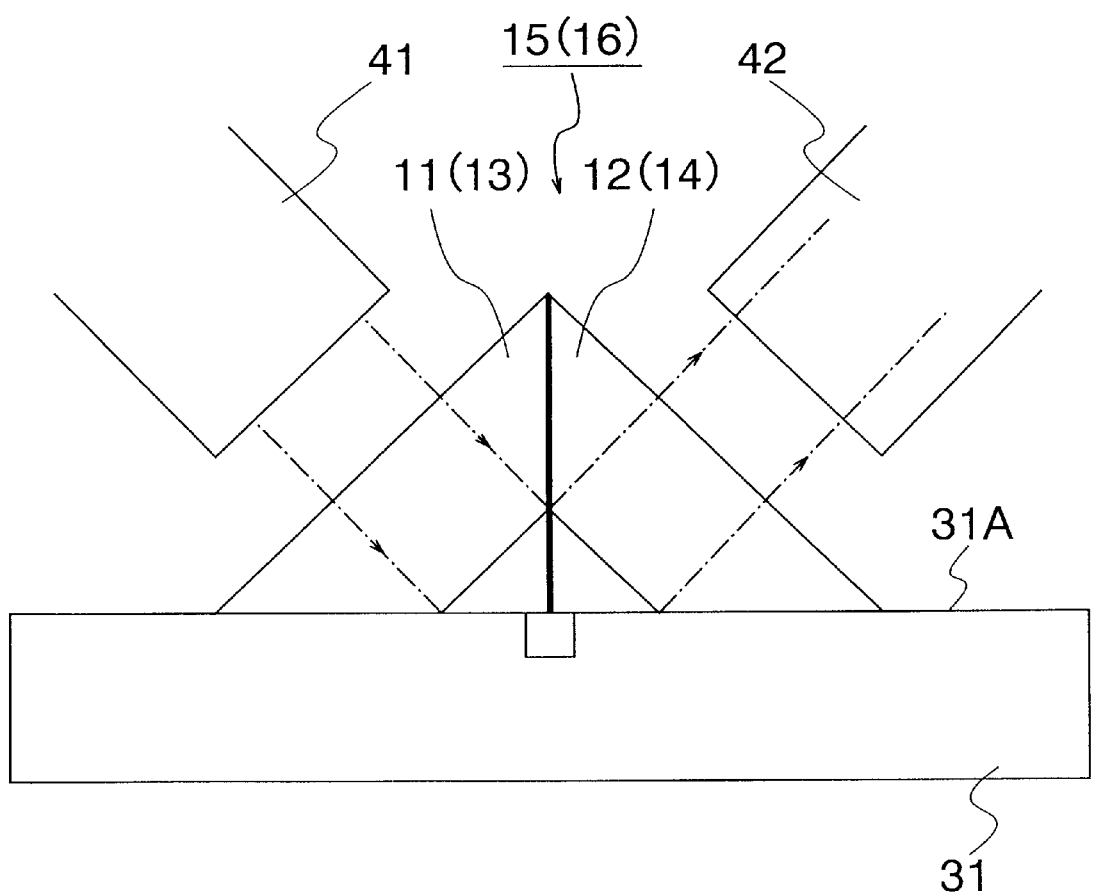
FIG. 17 is a front view of a method of manufacturing first and second connected members.

FIG. 17 is to explain this connecting process, in which the connected member 15 prepared by the above step is shown. In FIG. 17, reference numeral 31 denotes a reference base for the connection process, made of glass, ceramic, or metal etc.; and reference numeral 31 denotes a reference plane which is optically polished. This reference plane 31A is provided with a groove so that even if the adhesive agent is drop from the adhered surface, the reference plane is not stained.

The essential point of this step is that the slanting surface of the member 11 and that of the member 12 both contacting with the reference plane 31A should be arranged on a uniform flat plane. As shown in FIG. 17, a light ray emitted from a collimator 41 on the emission side is received by use of a collimator 42 on the light-receiving side, then the above-mentioned flatness of the plane is observed and examined.

The connected member 16 is prepared in the same manner as the connection member 15. The referential numerals in the parentheses in FIG. 17 denote the components of the connected member 16 which are identical to those of the connected member 15, and description thereof will be omitted.

Fourth Step

The connected member 15 and the connected member 16 are cemented together by an adhesive agent to produce the cross dichroic prism.

Figure 18:
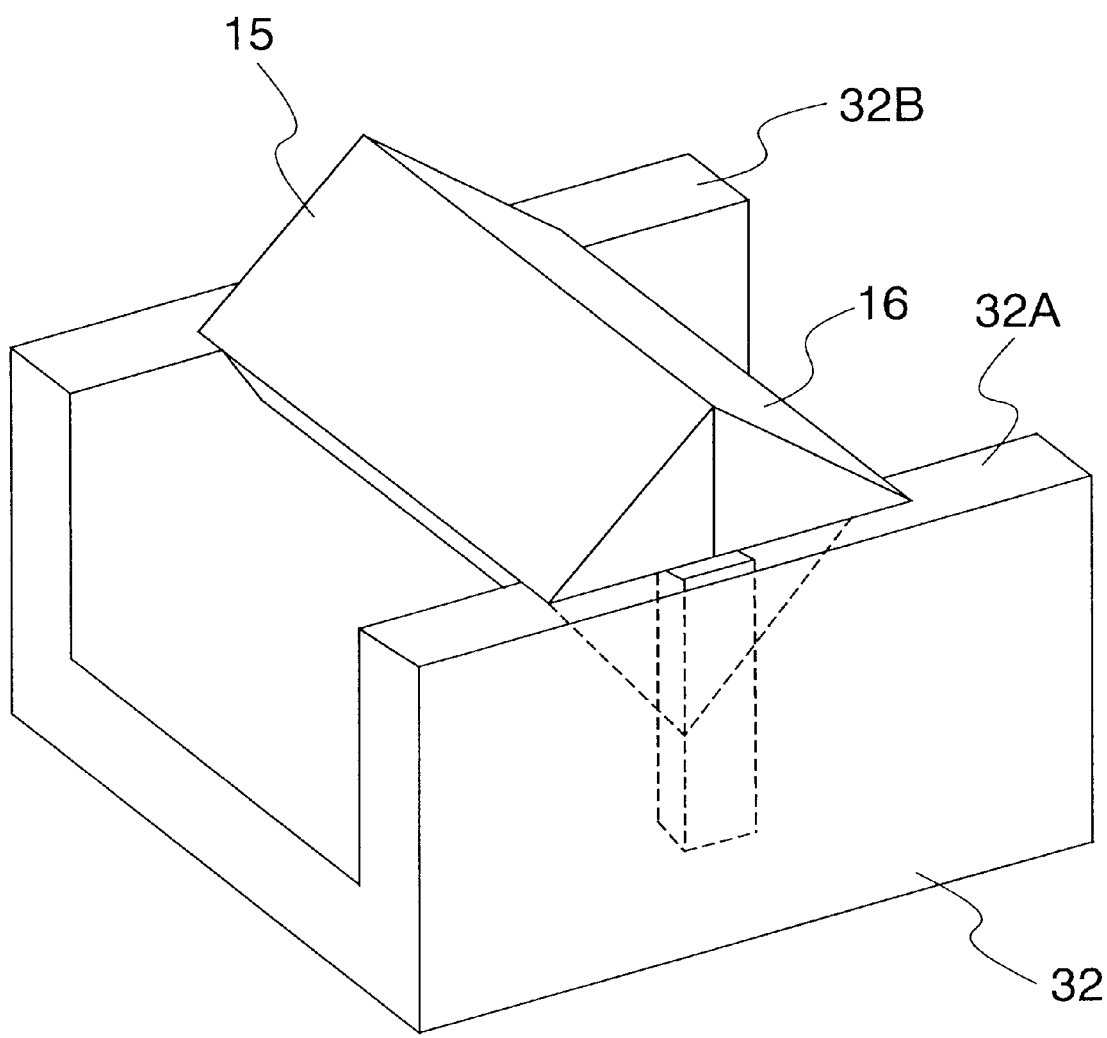
FIG. 18 is a perspective view of a method of manufacturing a cross dichroic prism by cementing the first and second connected members together.

FIG. 18 is a perspective view for showing a process of this cementation. In FIG. 18, reference numeral 32 denotes a jig for connection or cementation, made of glass, ceramic, or metal etc. Reference numerals 32A, 32B denote polished surfaces for making the same plane, serving as the reference planes for the cementing process.

The connected member 15 and the connected member 16 are cemented together so as to maintain a state in which the protruding portions of the respective members are in optical contact with the reference planes 32A, 32B, as shown in FIG. 18. It should be noted that each of the reference planes 32A, 32B is provided with a groove so that the adhesive agent dropping from the adhered surface does not stain the reference planes, in the same manner as in the previous step.

The essential point in this step is that the cementing process is carried out in a state in which the protruding portions of the connected members 15 and 16 are in optical contact with the reference planes 32A, 32B, so as to achieve the flatness of the portions of the both members contacting with the reference planes.

Figure 19:
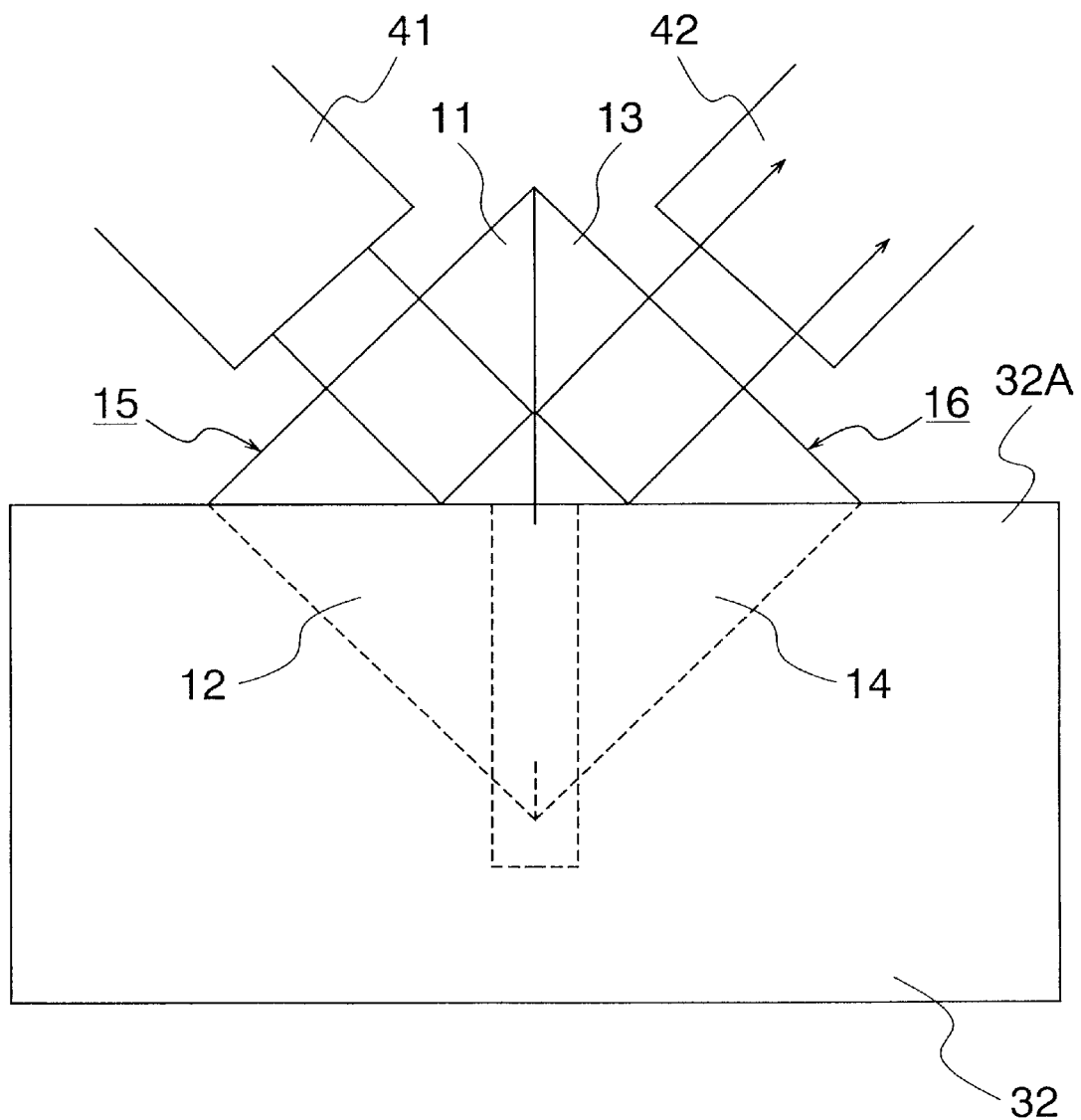
FIG. 19 is a front view of the method of manufacturing the cross dichroic prism by cementing the first and second connected members together.

FIG. 19 is a front view for showing a manner of observing and examining the above-mentioned flatness by use of the collimators 41 and 42.

A front view of the cross dichroic prism 1 produced by the present step is shown in FIG. 20. As shown in FIG. 20, the first light reflecting dichroic films 11B, 13B and the second light reflecting dichroic films 11R, 12R for forming the cross dichroic prism 1 are respectively formed to be on the same uniform plane.

It is essential that these dichroic films can be produced on the same uniform plane (having no difference in level which may be caused by the thickness of the adhesive agent at the center). If a cross dichroic prism which satisfies the above-mentioned relationships between the refractive indexes of the prism members and which is produced to have the dichroic films satisfying the required flatness is used as a means for composing the light beams emitted from the light valves of the projecting apparatus, an excellent projected image having no registration shift and generating no double image can be obtained.

A method for producing the cross dichroic prism 1 with dichroic films having the flatness is not limited to the above-mentioned method.

Second Assembling Method

First Step

There are prepared transparent optical prism members 21, 22 having the same cross section of a right-angled isosceles triangular prism. These optical prism members 21, 22 have the refractive indexes n21, n22. These refractive indexes satisfy the equation (8) or (9) if the values of n1 and n3 are used as n21, while the values of n2 and n4 as n22. In this case, the cross sections of the prism members take the same form, and the prism member 21 is arranged to be longer than the member 22.

The bottom surfaces, the slanting surfaces and the side surfaces of these members are ground with accuracy in advance, so as to maintain the predetermined forms thereof.

Second Step

The bottom surfaces of the members 21, 22 which are opposite to the right angles and the both slanting surfaces which sandwich the right-angle portions therebetween are optically polished.

Third Step

A dichroic film having a reflecting character for reflecting the first light (B light) is formed on the polished bottom surface of the member 21 by a physical vapor deposition such as vacuum vapor deposition.

It should be noted that no dichroic film is formed on the member 22.

Fourth Step

The member 21 and the member 22 are cemented together in such a manner that the bottom surface with the first light reflecting dichroic film formed thereon and the polished bottom surface with no dichroic film formed are cemented together by an adhesive agent, so as to form a connected member 23.

Figure 21:
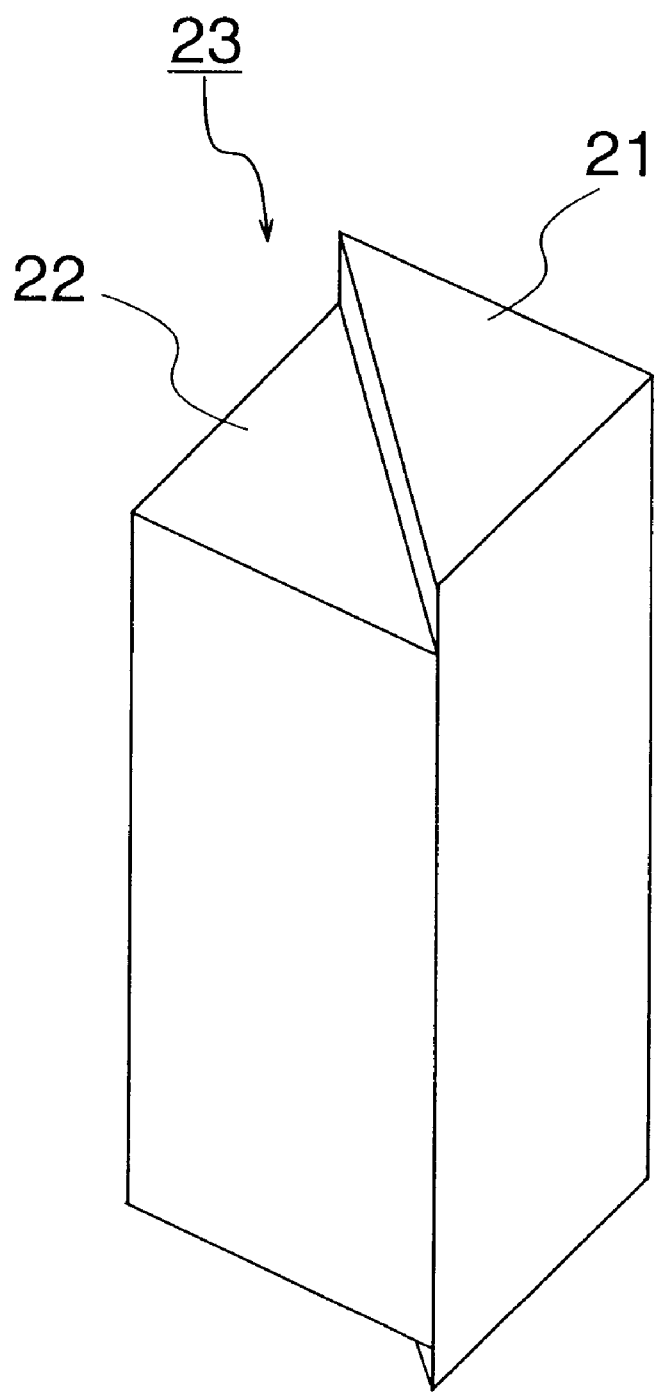
FIG. 21 is a perspective view for showing the connection member.

FIG. 21 is a perspective view of the connected member 23. As shown in FIG. 21, the member 21 is longer than the member 22, as stated above, so that the connected member 23 is formed in such a manner that the longer member 21 is protruding from both ends of the shorter member 22 by substantially the same length. This is because these protruding portions are used when the first connection member 25 and the second connection member 26 are further cemented together to form the dichroic prism at the formation of the cross dichroic prism at the last step, as to be described later.

Since the member 21 is longer than the member 22 in the present embodiment, the first light reflecting dichroic film is exposed on the joint surface and on extended surfaces from the joint surface of the above-mentioned protruding portions.

Fifth Step

Figure 22:
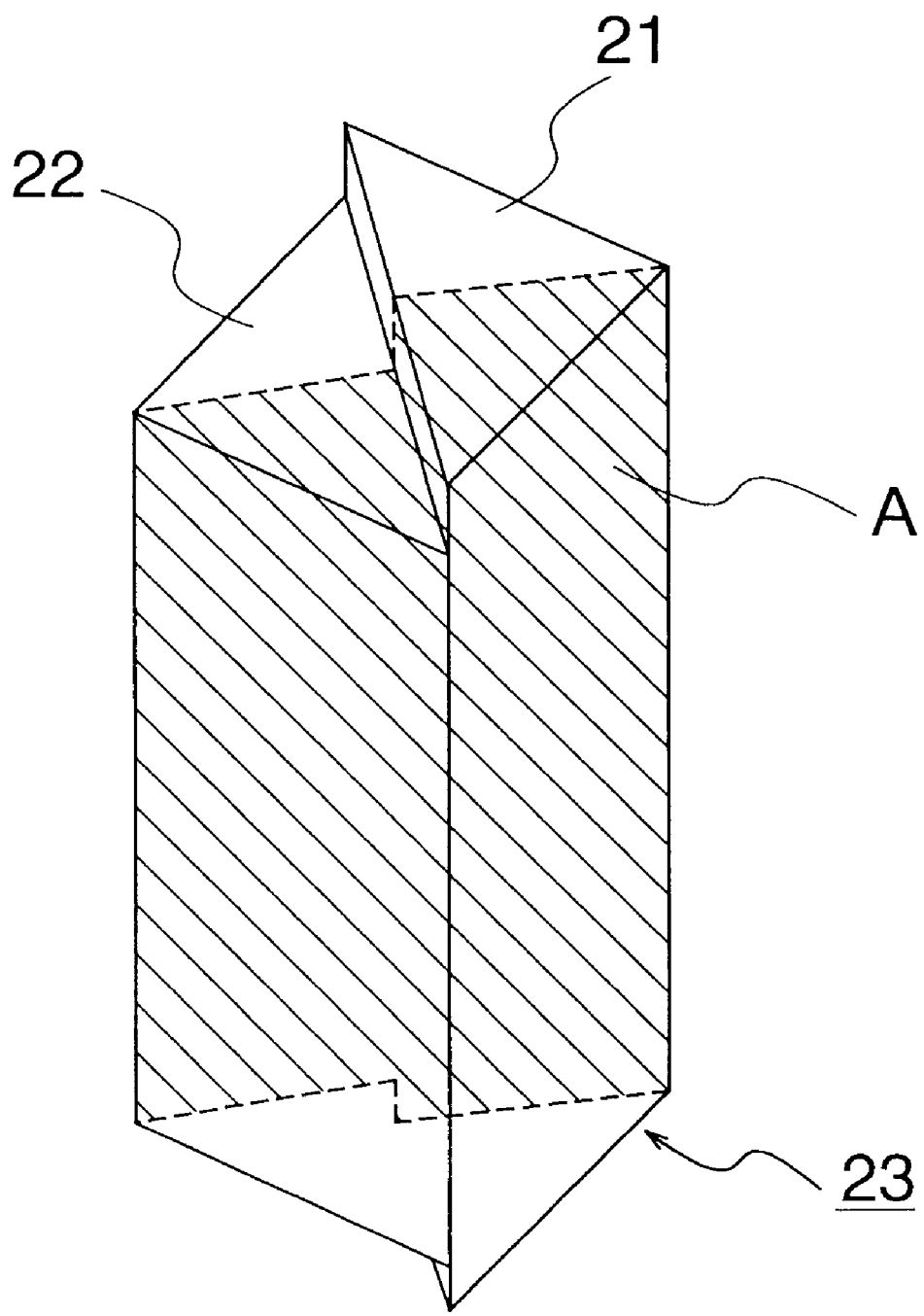
FIG. 22 is a view for showing a cut-away section of the connected member.

The connected member 23 is cut out along a plane perpendicular to the joint surface between the connection member 21 and the connection member 22 of the connected. member 23 which is produced by the above step. FIG. 22 shows a cut-away face A of the connected member 23.

Figure 23:
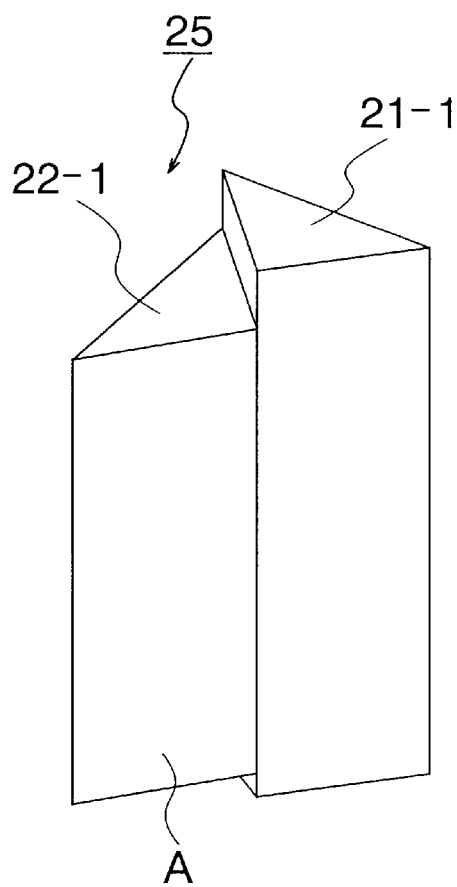
FIG. 23A and FIG. 23B are perspective views for showing the connection members to be connected.
Figure 23:
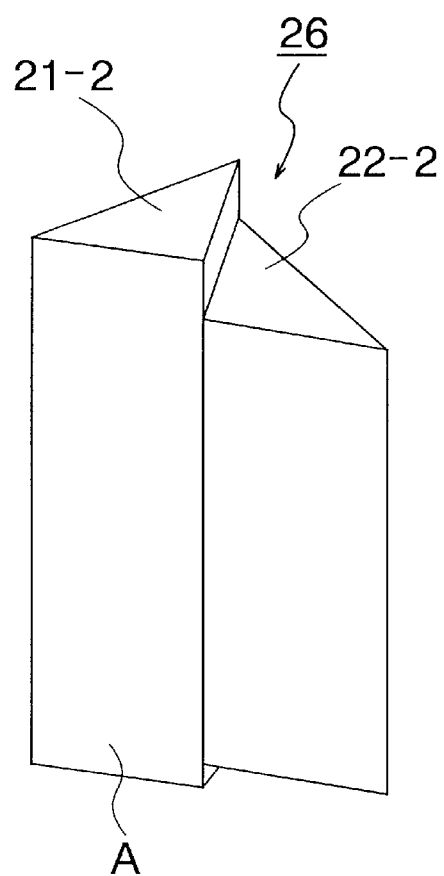

FIGS. 23A and 23B are perspective views of the first connection member 25 to be connected and the second connection member 26 to be connected, respectively produced by the cutting-out. The first connection member 25 is produced by cementing a member 21-1 and a member 22-1 together, while the second connection member 26 is produced by cementing a member 21-2 and a member 22-2 together.

Sixth Step

The above-mentioned cut-away faces of the first connection member 25 and the second connection member 26 which have been produced by the above step are ground and optically polished, respectively. These polished faces are required to be perpendicular accurately to the joint face between the member 21-1 and the member 22-1 which constitute the first connection member 25 and to the joint face between the member 21-2 and the member 22-2 which constitute the second connection member 26, respectively.

Seventh Step

A second light (R light) reflecting dichroic film is produced by physical vapor deposition such as vacuum vapor deposition on the polished bottom surface of either the first connection member 25 or the second connection member 26. The flatness of the second light (R light) reflecting dichroic film can be secured without fail by the previous step and this step.

Eighth Step

The second light reflecting dichroic film on the bottom surface of the first connection member 25 or the second connection member 26 and the polished face with no dichroic film formed are cemented together by use of an adhesive agent to produce a dichroic prism.

A perspective view for showing a manner of the above cementation is the same as that in FIG. 17 and FIG. 18 for showing the previous fourth step.

A perspective view of the cross dichroic prism produced by the present step is the same as that produced by the previous step, which is shown in FIG. 15 or FIG. 16.

Further, a front view of the above cross dichroic prism is the same as that shown in FIG. 20, which prism renders the same effects as those obtained by the cross dichroic prism produced by the previous step.

In addition, it is possible to make the refractive indexes of n1 and n3 to be substantially the same and the refractive indexes of n2 and n4 to be substantially the same.

The present invention was described above by way of the preferred embodiments thereof. However, the invention is not limited to these embodiments.

What is claimed is:

1. A color composing optical system comprising a liquid crystal light valve having a plurality of pixels and a cross dichroic prism for color-composing light beams emitted from said liquid crystal light valve, characterized in that the following equation is satisfied:

$$L \times |\tan\Theta| \leq W/2,$$

where the length of a pixel pitch of said liquid crystal light valve is W, the air-converted length from the emission surface of said liquid crystal light valve to the emission surface of said cross dichroic prism is L, and a value of a relative angular deviation when two light rays emitted from said liquid crystal light valve in parallel with the optical axis enter said cross dichroic prism and then are emitted from said cross dichroic prism is $\Theta$.

2. A color composing optical system according to claim 1, wherein said cross dichroic prism has two pairs of light reflecting dichroic films each pair arranged on the same plane.

3. A color composing optical system comprising a liquid crystal light valve having a plurality of pixels, and a cross dichroic prism including four right-angled isosceles triangular prisms cemented together with dichroic films therebetween for color-composing light beams emitted from said liquid crystal light valve, characterized in that the following equation is satisfied:

$$L \times |\tan(0.27 \times N1/3600)| \leq W/2,$$

where a value of $10^6$ times an absolute value of $\Delta 1$ which is defined by the following equation is N1:

$$\Delta 1 = (n1^2 + n4^2)/2 - (n2^2 + n3^2)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of said liquid crystal light valve is W; and the air-converted length from the emission surface of said liquid crystal light valve to the emission surface of said cross dichroic prism is L.

4. A color composing optical system comprising a liquid crystal light valve having a plurality of pixels, and a cross dichroic prism including four right-angled isosceles triangular prisms cemented together with dichroic films therebetween for color-composing light beams emitted from said liquid crystal light valve, characterized in that the following equation is satisfied:

$$L \times |\tan(0.8 \times N2/3600)| \leq W/2,$$

where a value of $10^6$ times an absolute value of $\Delta 2$ defined by the following equation is N2:

$$\Delta 2 = (n1 + n4)/2 - (n2 + n3)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of said liquid crystal light valve is W; and the air-converted length from the emission surface of said liquid crystal light valve to the emission surface of said cross dichroic prism is L.

5. A method of controlling the color composing optical system comprising a liquid crystal light valve having a plurality of pixels and a cross dichroic prism for color-composing light beams emitted from said liquid crystal light valve, characterized in that the following equation is satisfied:

$$L \times |\tan\Theta| \leq W/2,$$

where the length of a pixel pitch of said liquid crystal light valve is W, the air-converted length from the emission surface of said liquid crystal light valve to the emission surface of said cross dichroic prism is L, and a value of a relative angular deviation when two light rays emitted from said liquid crystal light valve in parallel with the optical axis enter said cross dichroic prism and then are emitted from said cross dichroic prism is $\Theta$.

6. A method of controlling the color composing optical system comprising a liquid crystal light valve having a plurality of pixels, and a cross dichroic prism including four right-angled isosceles triangular prisms cemented together with dichroic films therebetween for color-composing light beams emitted from said liquid crystal light valve, characterized in that the following equation is satisfied:

$$L \times |\tan(0.27 \times N1/3600)| \leq W/2,$$

where a value of $10^6$ times an absolute value of $\Delta 1$ which is defined by the following equation is N1:

$$\Delta 1 = (n1^2 + n4^2)/2 - (n2^2 + n3^2)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of said liquid crystal light valve is W; and the air-converted length from the emission surface of said liquid crystal light valve to the emission surface of said cross dichroic prism is L.

7. A method of controlling the color composing optical system comprising a liquid crystal light valve having a plurality of pixels, and a cross dichroic prism including four right-angled isosceles triangular prisms cemented together with dichroic films therebetween for color-composing light beams emitted from said liquid crystal light valve, characterized in that the following equation is satisfied:

$$L \times |\tan(0.8 \times N2/3600)| \leq W/2,$$

where a value of $10^6$ times an absolute value of $\Delta 2$ defined by the following equation is N2:

$$\Delta 2 \times (n1+n4)/2 - (n2+n3)/2,$$

in which the refractive indexes of one pair of the right-angled isosceles triangular prisms each arranged opposite to each other are n1 and n4, and the refractive indexes of the other pair of the right-angled isosceles triangular prisms each arranged opposite to each other are n2 and n3;

the length of a pixel pitch of said liquid crystal light valve is W; and the air-converted length from the emission surface of said liquid crystal light valve to the emission surface of said cross dichroic prism is L.

* * * * *